(12) United States Patent
Kiyono et al.

(10) Patent No.: US 7,770,438 B2
(45) Date of Patent: Aug. 10, 2010

(54) HEAD SLIDER, GLIDE HEIGHT CHECKING APPARATUS, AND GLIDE HEIGHT CHECKING METHOD

(75) Inventors: Hiroshi Kiyono, Tokyo (JP); Nobuya Oyama, Tokyo (JP); Katsuki Kurihara, Tokyo (JP); Noboru Yamanaka, Tokyo (JP); Chung Keung Ho, Hong Kong (CN); Cheung Kwan Lau, Hong Kong (CN); Tatsushi Shimizu, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 525 days.

(21) Appl. No.: 11/819,096

(22) Filed: Jun. 25, 2007

(65) Prior Publication Data
US 2008/0007871 A1    Jan. 10, 2008

(30) Foreign Application Priority Data

Jul. 7, 2006    (JP)    ............................. 2006-188559
Jul. 7, 2006    (JP)    ............................. 2006-188560

(51) Int. Cl.
*G11B 21/12*    (2006.01)

(52) U.S. Cl. ...................... 73/104; 360/235.4
(58) Field of Classification Search ........................ None
See application file for complete search history.

(56) References Cited

U.S. PATENT DOCUMENTS 6,052,243 A * 4/2000 Shimada ...................... 360/46
6,181,520 B1 * 1/2001 Fukuda ...................... 360/244.1
7,086,931 B2    8/2006 Oyama et al.
2005/0213250 A1 * 9/2005 Kurita et al. ............. 360/234.4

FOREIGN PATENT DOCUMENTS

| JP | A 09-128745   | 5/1997  |
| JP | A 09-259401   | 10/1997 |
| JP | A 10-027342   | 1/1998  |
| JP | A 2004-335073 | 11/2004 |
| JP | A 2006-031886 | 2/2006  |

* cited by examiner

*Primary Examiner*—Hezron Williams
*Assistant Examiner*—Mark Shabman
(74) *Attorney, Agent, or Firm*—Oliff & Berridge, PLC

(57) ABSTRACT

The head slider has a plurality of heaters each heating a corresponding region of the ABS, and a sensor detecting collision of the ABS with a projection on a surface of the magnetic disk. Currents supplied to the respective heaters are controlled and produce heats independently of one another. The heats produce projections on the corresponding regions of the ABS, respectively. The ABS with asperity can be planarized through appropriately controlling magnitude of the currents supplied to the heaters. Thus, the variation of a sensor output depending on asperity of the ABS is effectively reduced. Another head slider has a heater locally heating a corresponding region of the ABS. The heater has a structure where a central portion is away from the ABS compared with end portions, or a structure where calorific power of a central portion is smaller than that of each of end portions. Thus, overall projection shape becomes flat.

15 Claims, 28 Drawing Sheets

HEAD SLIDER, GLIDE HEIGHT CHECKING APPARATUS, AND GLIDE HEIGHT CHECKING METHOD

BACKGROUND OF THE INVENTION

1. Field of the Invention

The present invention relates to a head slider used when height (glide height) of a projection on a surface of a magnetic disk is checked, a glide height checking apparatus having the head slider, and a glide height checking method using the head slider.

2. Background Art

A magnetic disk device performs write and read while a magnetic head is allowed to fly by an airflow accompanying rotation of a magnetic disk. Flying height of a magnetic disk (hereinafter, simply called "flying height") is reduced in accordance with increase in write density of the magnetic disk, and has been decreased to be less than 10 nm in recent years. However, when flying height is less than 10 nm, the magnetic head tends to be contacted to a projection on a surface of the magnetic disk, so that a property of the magnetic head is possibly changed due to friction heat or deformation caused by such contact. Therefore, in the magnetic disk, the projection on the surface is similarly reduced by accurate surface processing (varnishing), and height of the projection (glide height) has been required to be decreased to be less than 4 nm in recent years.

While the glide height is checked by using a glide height checking apparatus having a special head slider, when the glide height is decreased to be less than 4 nm as described above, it is necessary that the head slider is allowed to accurately fly with a flying height of less than 4 nm. That is, the head slider must be allowed to fly with a flying height extremely lower than a flying height in the case of the magnetic head of the magnetic disk device.

Usual glide height checking apparatuses are disclosed in Japanese Unexamined Patent Publications No. 10-27342, No. 2006-31886, No. 9-259401, and No. 9-128745.

SUMMARY OF THE INVENTION

In the head slider, typically, width (track width) of an air bearing surface of the head slider is extremely large compared with track width of a magnetic head mounted on a magnetic disk device in order to increase area of a magnetic disk that can be checked in one scan. However, even if track width of the head slider is increased, when the air bearing surface has asperity, output of a sensor (sensitivity) may vary depending on a point in the air bearing surface with which a projection on a surface of the magnetic disk collides.

When variation occurs in sensitivity of the sensor in this way, a measurement error occurs due to the variation, therefore particularly in the case that the head slider is allowed to fly with a flying height of less than 4 nm, the glide height may not be accurately checked.

To allow the head slider to fly with a predetermined flying height, it is necessary that flying force induced on the air bearing surface of the head slider is balanced with resultant force (pressing load) of gravity of the head slider and spring load of a suspension attached to one end of the head slider, and each of these kinds of force has a predetermined magnitude. However, since a profile of the air bearing surface of the head slider varies among individuals due to processing accuracy, flying force induced on the head slider is subtly different for each head slider. Since a shape or property of the suspension varies among individuals similarly as the head slider, a pitch angle or spring load is also subtly different for each suspension. Therefore, when flying height of the head slider is decreased to be approximately less than 4 nm, variation in flying height among individuals due to subtle difference in flying force or pressing load is increased so as to be not negligible, so that it has not been easy that the head slider is allowed to accurately fly with a low flying height.

In a view of foregoing, it is desirable to provide a head slider that can accurately check glide height even if the air bearing surface has asperity, a glide height checking apparatus having the head slider, and a glide height checking method using the head slider. It is further desirable to provide a head slider that can be allowed to accurately fly while keeping low flying height, and a glide height checking apparatus having the head slider.

A head slider of a mode of the invention with an air bearing surface is utilized for checking a magnetic disk, and has a plurality of heaters, each heater locally heating a corresponding region of the air bearing surface, and a sensor detecting collision of the air bearing surface with a projection on a surface of the magnetic disk. Here, the air bearing surface refers to a surface facing the magnetic disk (disk-facing surface).

In the head slider of the mode of the invention, since the plurality of heaters, each heater locally heating a corresponding region of the air bearing surface are provided, currents to be supplied to the respective heaters can be controlled independently of one another. Here, when a heater is applied with a current to generate heat, and a part of the air bearing surface is heated by the heat, the part is projected due to thermal expansion. Since projecting height of the part varies depending on calorific power of the heater, even if a part of the air bearing surface has asperity, magnitude of a current to be supplied to each of the heaters is appropriately controlled, thereby the part having the asperity can be planarized. Thus, since possibility that output of the sensor (sensitivity) varies depending on a point in the air bearing surface with which the projection collides is eliminated, glide height can be accurately checked.

A glide height checking apparatus of a mode of the invention has the head slider, and a current control section supplying a current to each of the heaters, magnitude of the current being determined based on asperity information which represents asperity condition of the air bearing surface.

In the glide height checking apparatus of the mode of the invention, since the plurality of heaters, each heater locally heating a corresponding region of the air bearing surface are provided in the head slider, and furthermore the current control section is provided, which supplies a current to each of the heaters, magnitude of the current being determined based on asperity information which represents asperity condition of the air bearing surface, a current is supplied to each of the heaters based on the asperity information. Thus, even if a part of the air bearing surface has asperity, the part having asperity can be planarized. Thus, since possibility that output (sensitivity) of the sensor varies depending on a location in the air bearing surface with which the projection collides is eliminated, glide height can be accurately checked.

Here, in the head slider and the glide height checking apparatus of the respective modes of the invention, when the heaters are arranged on a trailing edge of the air bearing surface in a direction of track width along the air bearing surface along the air bearing surface, width of a planarized region in the end portion on the trailing edge of the air bearing surface can be freely changed. Thus, an area of the magnetic disk that can be checked in one scan can be easily increased. It is preferable that the sensor is provided on the trailing edge of the air bearing surface, and allowed to extend in a direction (track width direction) along the air bearing surface, similarly as the heaters.

A glide height checking method of a mode of the invention uses the head slider, and includes the following two steps:

(1) a step of allowing the head slider to fly on the magnetic disk, and supplying a current to each of the plurality of heaters based on asperity information showing an asperity condition of a part of the air bearing surface so that the part of the air bearing surface is heated, and (2) a step of allowing the projection on the surface of the magnetic disk to collide with each of heated regions heated by the plurality of heaters in the air bearing surface at a predetermined linear velocity.

In the glide height checking method of the mode of the invention, since a current is supplied to each of the plurality of heaters based on the asperity information showing the asperity condition of a part of the air bearing surface, even if the part of the air bearing surface has asperity, the part having asperity can be planarized. Thus, since possibility that output (sensitivity) of the sensor varies depending on a point in the air bearing surface with which the projection collides is eliminated, glide height can be accurately checked.

A head slider of a different mode of the invention with an air bearing surface is utilized for checking a magnetic disk, and has a heater locally heating a corresponding region of the air bearing surface, and a sensor detecting collision of the air bearing surface with a projection on a surface of the magnetic disk.

A glide height checking apparatus of a different mode of the invention has the head slider of the different mode of the invention.

In the head slider and the glide height checking apparatus of the different modes of the invention, since the heater locally heating a corresponding region of the air bearing surface is provided, when a heater is allowed to generate heat to heat a part of the air bearing surface, the part of the air bearing is projected due to thermal expansion. Since projecting height of the part varies depending on calorific power of the heater, calorific power of the heater is controlled, thereby the projecting height can be adjusted to a predetermined level. Thus, variation in flying height among individuals due to subtle difference in flying force or pressing load can be absorbed by adjusting the projecting height. As a result, the head slider can be allowed to accurately fly with a low flying height of, for example, less than 4 nm.

Here, in the head slider and the glide height checking apparatus of the different modes of the invention, in the case that the heater is provided on the trailing edge of the air bearing surface, and allowed to extend in a track width direction, when the heater is in a structure where a central portion is away from the air bearing surface compared with end portions, or in a structure where calorific power of the central portion is smaller than calorific power of each of the end portions, temperature distribution in a portion (heater-facing portion) can be made uniform in the track width direction, the portion being the end portion on the trailing edge of the air bearing surface, and facing the heater. At that time, since height of a projection due to thermal expansion is also uniform in a region having uniform heating temperature, projecting height of the heater-facing portion can be made uniform. Therefore, width of the heater is adjusted, thereby width of a portion having uniform projecting height can be freely set, and therefore an area in the magnetic disk that can be checked in one scan can be easily increased.

In place of devising a shape of the heater as above, width of the heater can be adjusted in the track width direction so that width of the portion having uniform projecting height is also freely set. Specifically, length in the track width direction of the heater can be 1.3 times or more as large as that of a portion being desired to have uniform projecting height. For example, in the case that the sensor is provided on the trailing edge of the air bearing surface, and allowed to extend in the track width direction, length in the track width direction of the heater may be 1.3 times as large as length in the track width direction of the sensor, similarly as the heater. Therefore, again in this case, width in the track width direction of the heater can be adjusted so that width of a portion having uniform projecting height is freely set, and therefore an area in the magnetic disk that can be checked in one scan can be easily increased.

Other and further objects, features and advantages of the invention will appear from the following description as necessary.

DETAILED DESCRIPTION OF THE PREFERRED EMBODIMENTS

Hereinafter, an embodiment of the invention is described in detail with reference to drawings.

First Embodiment

Figure 1:
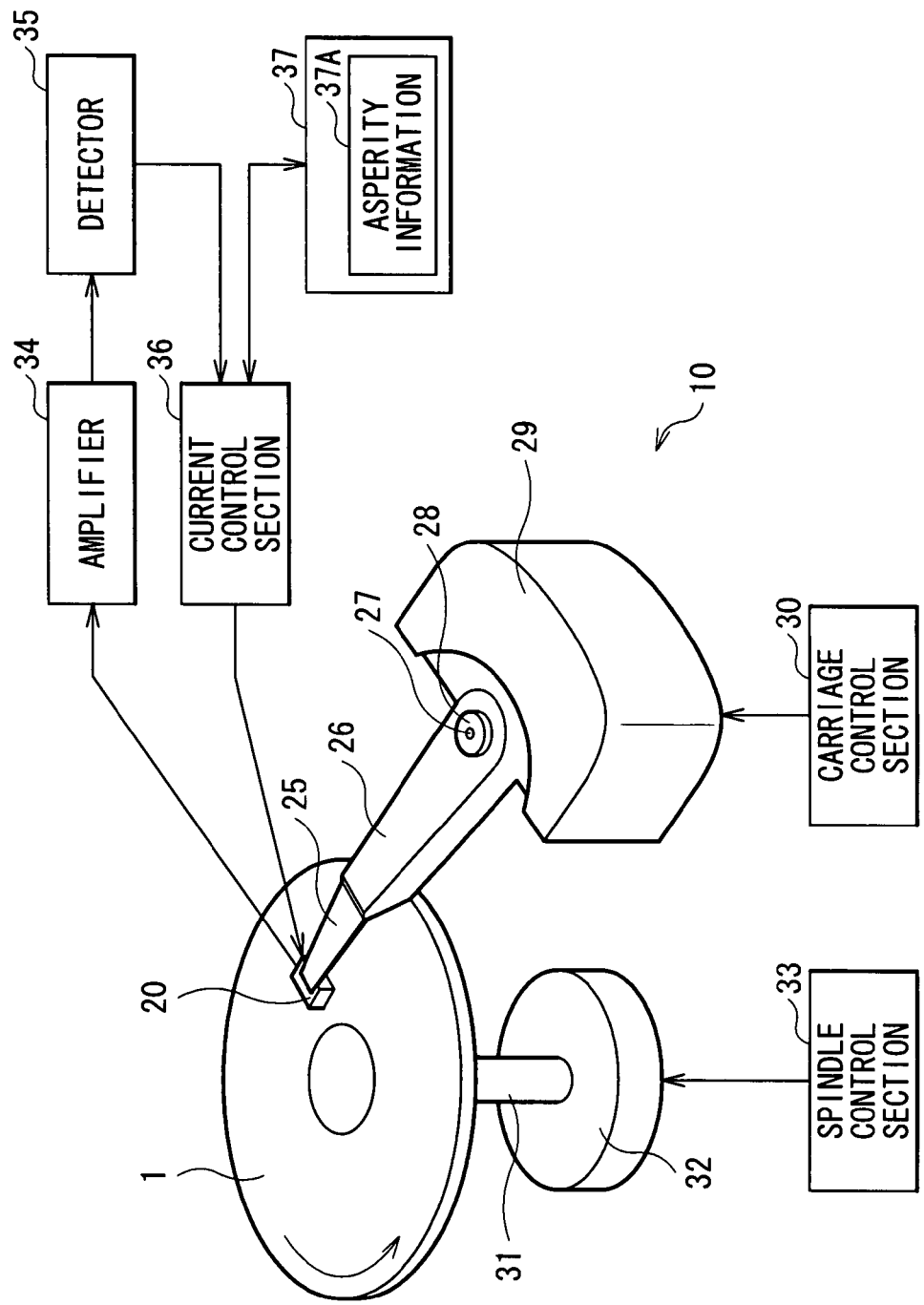
FIG. 1 is a schematic block diagram of a glide height checking apparatus according to a first embodiment of the invention.
Figure 2:
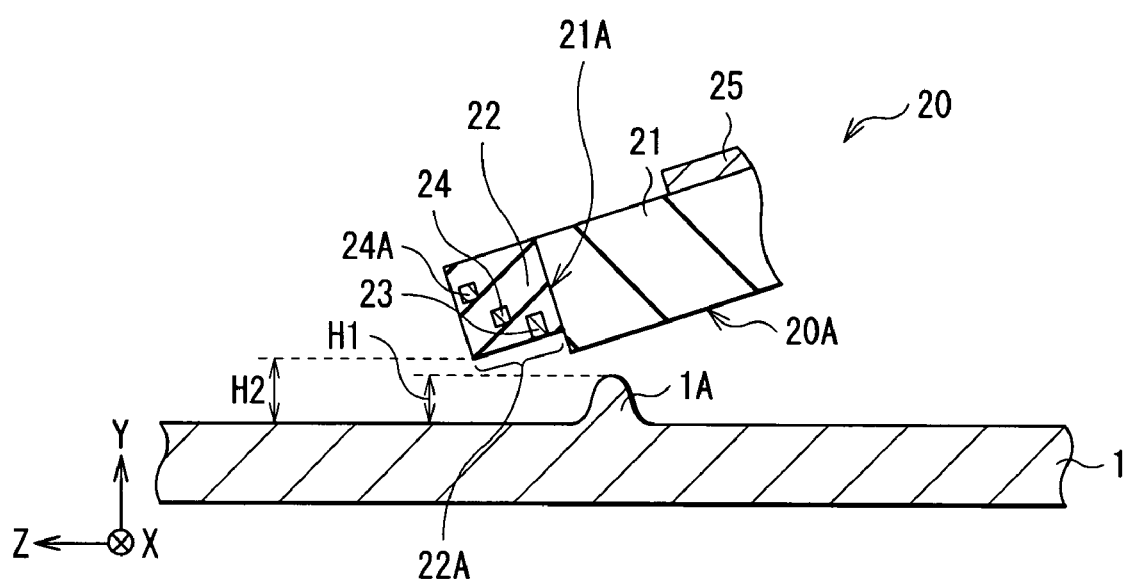
FIG. 2 is a sectional configuration diagram of a head slider in FIG. 1.
Figure 3:
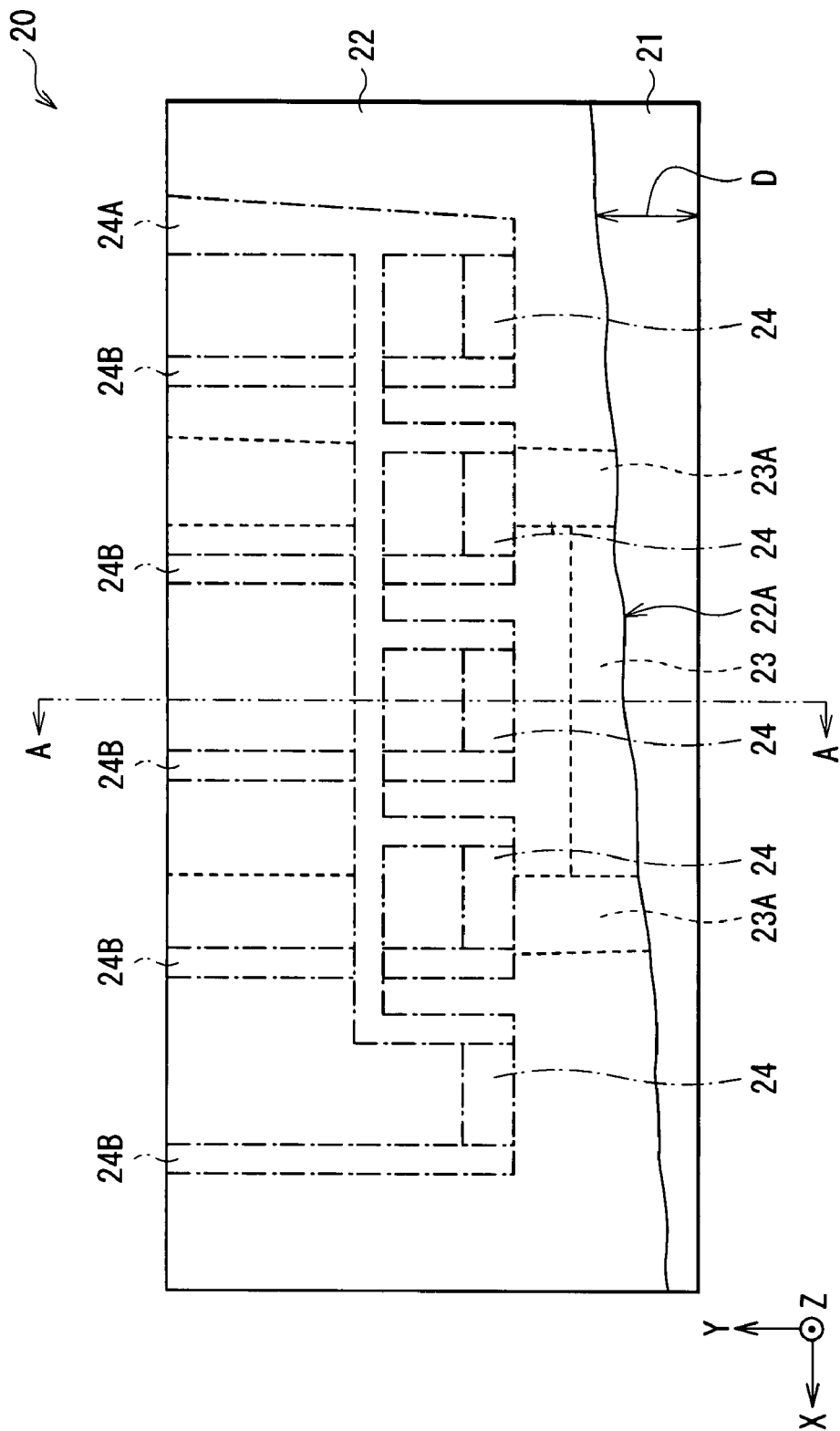
FIG. 3 is a plane diagram of a side face of the head slider in FIG. 1.
Figure 4:
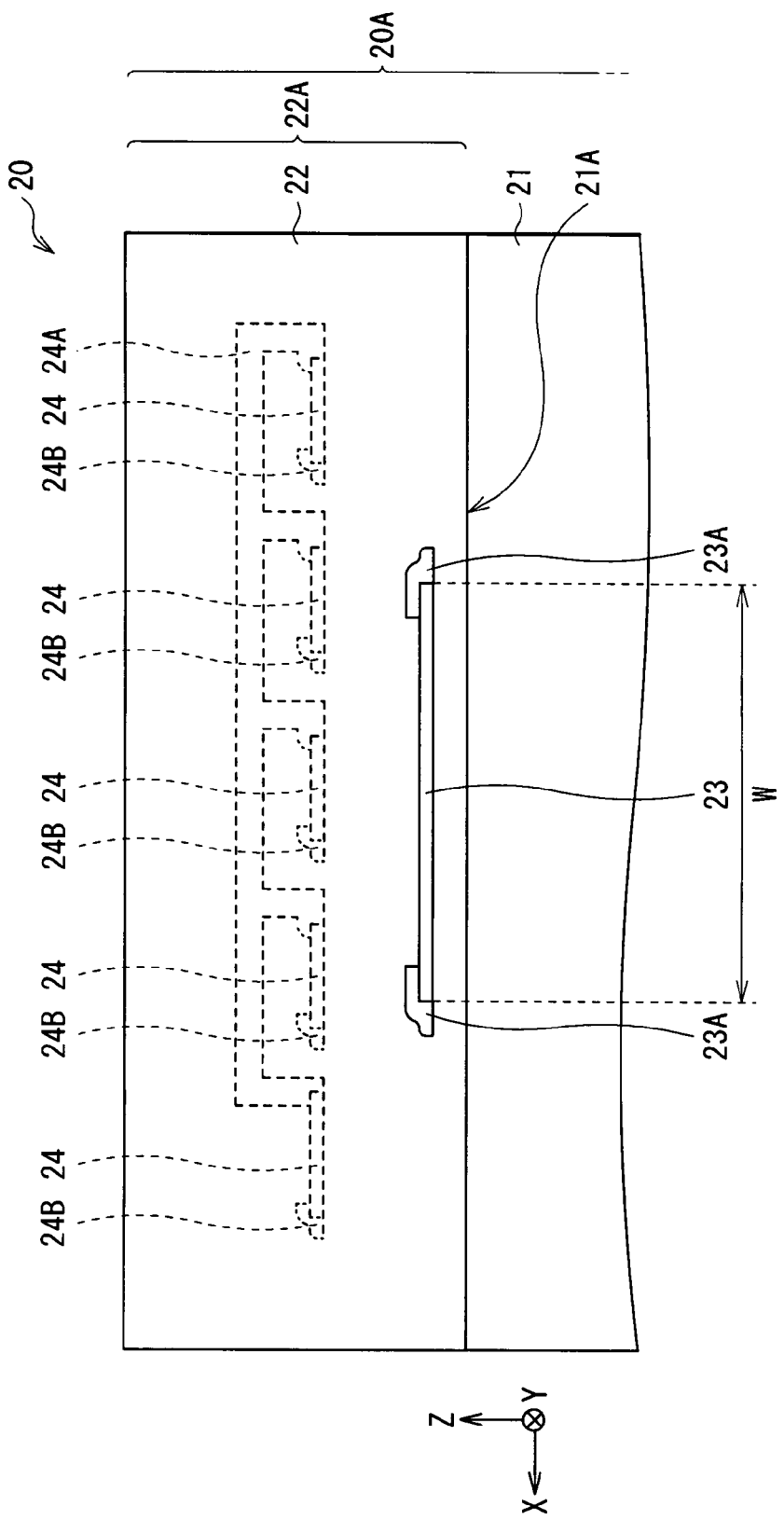
FIG. 4 is a plane diagram of a bottom of the head slider in FIG. 1.
Figure 5:
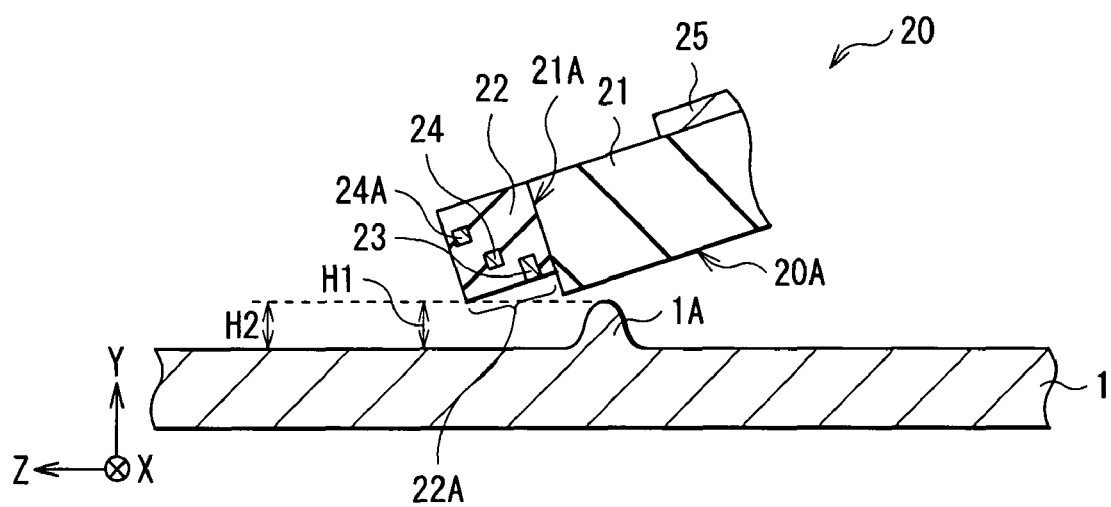
FIG. 5 is a sectional configuration diagram of the head slider when a heater is heated.
Figure 6:
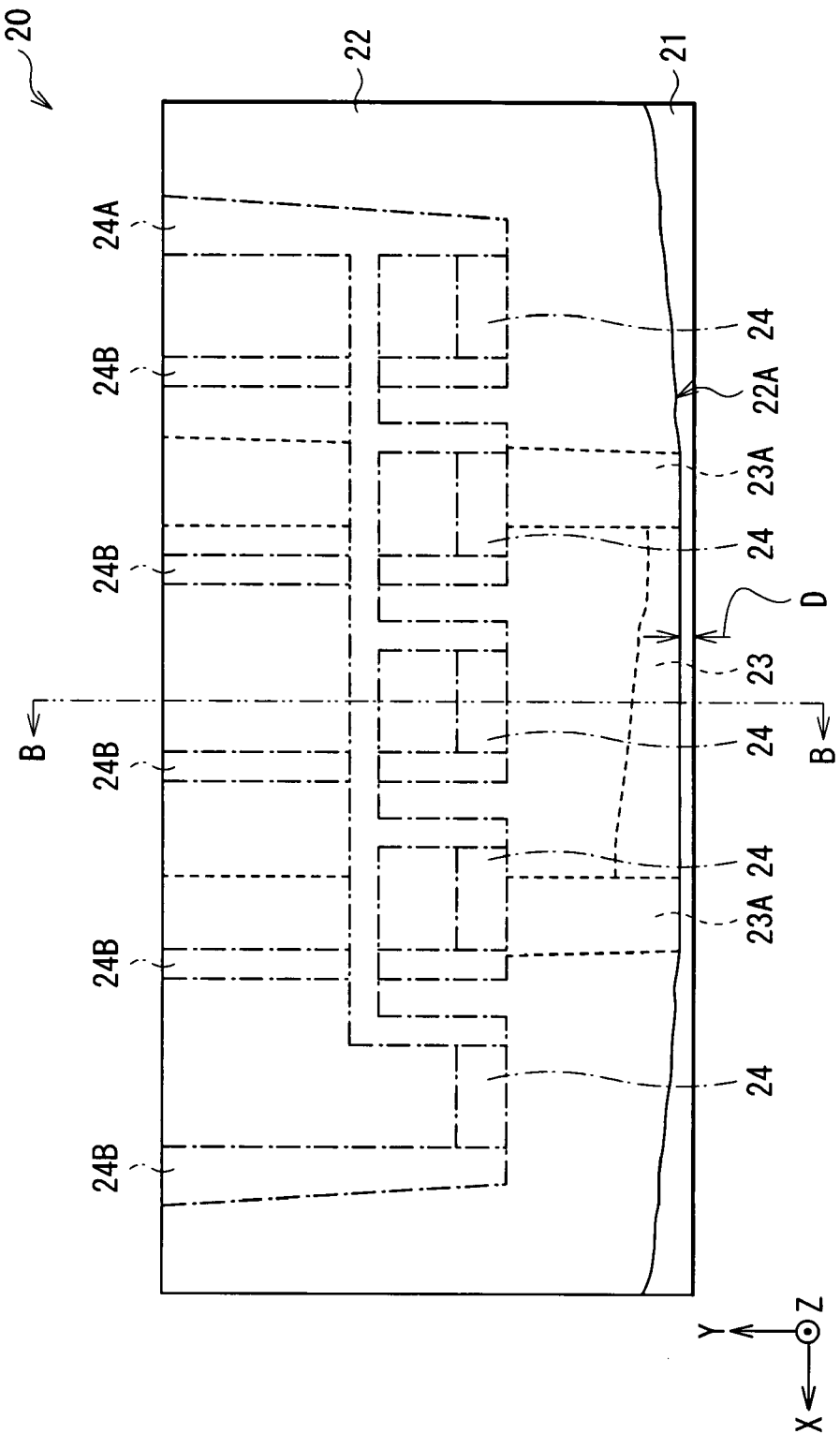
FIG. 6 is a plane diagram of a side face of the head slider of FIG. 5.

FIG. 1 shows a schematic configuration of a glide height checking apparatus 10 according to a first embodiment of the invention. FIGS. 2 and 5 show sectional configurations in a ZY plane of a head slider 20 in FIG. 1 respectively. FIGS. 3 and 6 are diagrams of an end portion 22A of the head slider 20 when it is seen from a rotational direction (Z axis direction) of a magnetic disk 1, respectively. FIG. 4 shows a planar configuration of the head slider 20 at an air bearing surface 20A side in an expanded manner. Here, FIG. 2 corresponds to a sectional configuration in an A-A arrow direction in FIG. 3, and FIG. 5 corresponds to a sectional configuration in a B-B arrow direction in FIG. 6. FIGS. 2 to 4 show appearance when a heater 24 described later is not heated, and FIGS. 5 to 6 show appearance when the heater 24 is heated. An X axis direction in the figures corresponds to a direction (hereinafter, called track width direction) along a line at which an air bearing surface 20A intersects with an end face 21A on a trailing edge, a Y axis direction in the figures corresponds to a direction perpendicular to a surface of the magnetic disk 1, and the Z axis direction in the figures corresponds to a rotational direction of the magnetic disk 1.

The glide height checking apparatus 10 is to detect height of a projection 1B (glide height) on a surface of the magnetic disk 1, in particular, the apparatus is preferably usable when checking the magnetic disk 1 required to have high flatness, for example, in the case that a specification of glide height H1 is less than 4 nm.

The glide height checking apparatus 10 has the head slider 20 detecting glide height. The head slider 20 is connected to an arm 26 via a suspension 25, and the arm 26 is pivotally connected to a carriage motor 29 via a bearing 28 with a fixed shaft 27 as a central axis.

Here, the suspension 25 presses the head slider 20 in a direction toward the surface of the magnetic disk 1 (positive to negative direction of the Y axis) with appropriate force, and adjusts a pitch angle of the head slider 20 to have appropriate measure. The arm 26 is to support the head slider 20 and the suspension 25. The carriage motor 29 is a power source to move the head slider 20 via the arm 26 in a radial direction of the magnetic disk 1, and controllably driven by a carriage control section 30. An internal configuration of the head slider 20 is described in detail later.

The glide height checking apparatus 10 has a spindle 31 inserted through an opening of the magnetic disk 1 at one end, and a spindle motor 32 connected to the other end of the spindle 31.

Here, the spindle motor 32 is a power source rotating the magnetic disk 1 in an XZ plane with the spindle 31 as a central axis, and for example, controllably driven by a spindle control section 33 such that linear velocity of a portion of the magnetic disk 1 is constant, the portion being opposed to the head slider 20. Here, a condition that linear velocity is constant refers to a condition that rotation frequency of the magnetic disk 1 is changed depending on a position of the head slider 20, and moving speed of the magnetic disk 1 is kept constant with respect to the head slider 20.

As shown in FIGS. 2 and 4, the head slider 20 has the air bearing surface 20A in a surface (disk-facing surface) of the head slider 20, the surface being opposed to a surface of the magnetic disk 1. The air bearing surface 20A has, for example, a structure where flying force is induced on the head slider 20 by an airflow accompanying rotation of the magnetic disk 1, so that when the magnetic disk 1 is rotated and thus the airflow is generated on the surface of the magnetic disk 1, the head slider 20 flies at a height (flying height H2) at which the flying force due to the air bearing surface 20A is balanced with resultant force (pressing load) of gravity of the head slider 20 and spring load of the suspension 25. Here, the flying height H2 refers to a distance between the head slider 20 and the magnetic disk 1.

As shown in FIGS. 2 to 4, the head slider 20 has a slider base 21, and an overcoat layer 22 formed on an end face (end face 21A on a trailing edge) of the slide base 21 at a negative side of the Z axis. A sensor 23 and a plurality of heaters 24 are incorporated within the overcoat layer 22.

The slider base 21 includes, for example, AlTiC. The overcoat layer 22, which includes an insulating material such as aluminum oxide ($Al_2O_3$) or aluminum nitride (AlN), protects the sensor 23 and the heater 24 and isolates them from each other. Since the overcoat layer 22 includes a soft material compared with the slider base 21 in this way, when the air bearing surface 20A is subjected to planarization, the overcoat layer tends to be processed deep compared with the slider base 21, and often has a slightly recessed profile with respect to the slider base 21 as shown in FIGS. 2 and 3.

The sensor 23 is to detect collision of the air bearing surface 20A with a projection 1A on the surface of the magnetic disk 1, and for example, an AE (Acoustic Emission) sensor, or a sensor having a thermal asperity effect such as Permalloy and magnetoresistance effect element. The sensor 23 is provided facing an end portion 22A on a trailing edge (bottom of the overcoat layer 22, see FIGS. 2 to 6) of the air bearing surface 20A (see FIGS. 2 and 4), and configured in a manner of extending in a direction along the air bearing surface 20A, that is, in a track width direction (X axis direction in the figure). The sensor 23 is connected with leads 23A, 23A (see FIGS. 3 and 4) at both ends respectively, and supplied with power via the leads 23A, 23A.

Here, thermal asperity is a phenomenon that the head slider 20 is contacted to the projection 1A on the magnetic disk 1 to generate heat, and internal resistance of the sensor 23 is changed by the heat, as a result, a current flowing through the sensor 23 is changed. When the sensor 23 has the thermal asperity effect, change in the current is outputted to a detector 35 via an amplifier 34. In this case, the detector 35 detects whether current variation due to the thermal asperity effect occurs or not from output of the sensor 23. When the sensor 23 is the AE sensor, it outputs oscillation energy, which is generated when the head slider 20 is contacted to the projection 1A on the magnetic disk 1, as a voltage signal, and inputs the output signal into the detector 35 via the amplifier 34. In this case, the detector 35 detects whether the voltage signal is inputted from the sensor 23 or not.

Width W in the track width direction of the sensor 23 (see FIGS. 3 and 4) is, for example, 60 µm. Thus, a surface of the magnetic disk 1 can be widely checked in one scan. While the sensor 23 is partially exposed on the air bearing surface 20A in FIGS. 2 to 4, the sensor 23 need not be always disposed in such a position, and the sensor can be disposed in a position where the sensor can sense contact of the projection 1A on the magnetic disk 1 to the air bearing surface 20A.

Each heater 24 includes NiCu, NiCr, Ta, TiW or the like, and is provided in a manner of facing part of the air bearing surface 20A. Moreover, each heater 24 is provided on the end portion 22A on the trailing edge in a direction of track width, and arranged along the air bearing surface 20A. That is, each heater 24 and the sensor 23 are disposed parallel to each other. One end of each heater 24 is connected to a common lead 24A, and the other end is connected to an individual lead 24B provided for each heater 24 (see FIGS. 3 and 4).

Respective leads 24B are isolated from one another, and power from a current control section 36 is supplied to the respective heaters 24 via the lead 24A and the plurality of leads 24B. Thus, each heater 24 converts part of power supplied via the lead 24A and the plurality of leads 24B into heat and thereby generates heat, and heats part of the air bearing surface 20A, specifically heats the end portion 22A on the trailing edge of the air bearing surface 20A by the heat, in addition, thermally expands such a heated region, and consequently projects the end portion 22A of the air bearing surface 20A to the surface of the magnetic disk 1 as shown in FIGS. 5 to 6.

A current control section 36 supplies a current to each of the plurality of leads 24B based on asperity information 37A stored in a storage section 37. That is, the section 36 controls currents to be supplied to the respective heaters 24 independently of one another.

Here, the asperity information 37A corresponds to magnitude of a current which is supplied to each of the plurality of heaters 24 such that when a master disk is prepared, the disk having one projection 1A in a predetermined height at a predetermined point, then the head slider 20 is allowed to fly on the master disk rotating with a constant linear velocity, and a head slider 20, of which the flying height H2 is nonuniform in the track width direction, is moved in a radial direction of the magnetic disk 1, so that the projection 1A on a surface of the master disk is allowed to sequentially collide with a plurality of points in the air bearing surface 20A, sensitivity of the sensor 23 is constant irrespective of location of collision with the projection 1A.

While each heater 24 is disposed away from the end face 21A on the trailing edge compared with the sensor 23, and disposed away from the air bearing surface 20A compared with the sensor 23 in FIGS. 2 to 6, the heater 24 need not be always disposed in such a position, and the heater 24 can be disposed in a position where when the heater 24 is heated, the end portion 22A of the air bearing surface 20A can be projected due to thermal expansion, as shown in FIGS. 5 and 6. For example, the heater 24 may be disposed in the same distance as the sensor 23 from the end face 21A on the trailing edge or closer to the end face 21A, or may be disposed close to the air bearing surface 20A.

In the glide height checking apparatus 10 of the embodiment, the spindle motor 32 is driven to rotate the magnetic disk 1 to induce airflow accompanying rotation of the magnetic disk 1. Then, flying force is generated on the air bearing surface 20A of the head slider 20, and the head slider 20 begins to fly from the magnetic disk 1. Then, the head slider 20 is stabilized at a flying height H2 at which the flying force is balanced with resultant force (pressing load) of gravity of the head slider 20 and spring load of the suspension 25.

At that time, the flying height H2 of the head slider 20 is required to be equal to a specification of glide height H1 (see FIGS. 2 and 5) to be detected in order to check whether the glide height H1 meets the specification or not.

However, since the overcoat layer 22 includes a soft material compared with the slider base 21 as described before, the end portion 22A on the trailing edge of the air bearing surface 20A often has a slightly recessed profile with respect to the slider base 21 as shown in FIGS. 2 and 3. Depth of such a recessed portion is typically called recess amount D, and the recess amount D may be nonuniform in the track width direction, for example, as shown in FIG. 3. That is, in this case, the end portion 22A of the air bearing surface 20A has asperity in accordance with distribution of the recess amount D, so that the flying height H2 of the head slider 20 becomes nonuniform in the track width direction, and therefore output (sensitivity) of the sensor varies depending on a point in the air bearing surface 20A with which the projection 1A on the surface of the magnetic disk 1 collides.

Figure 7:
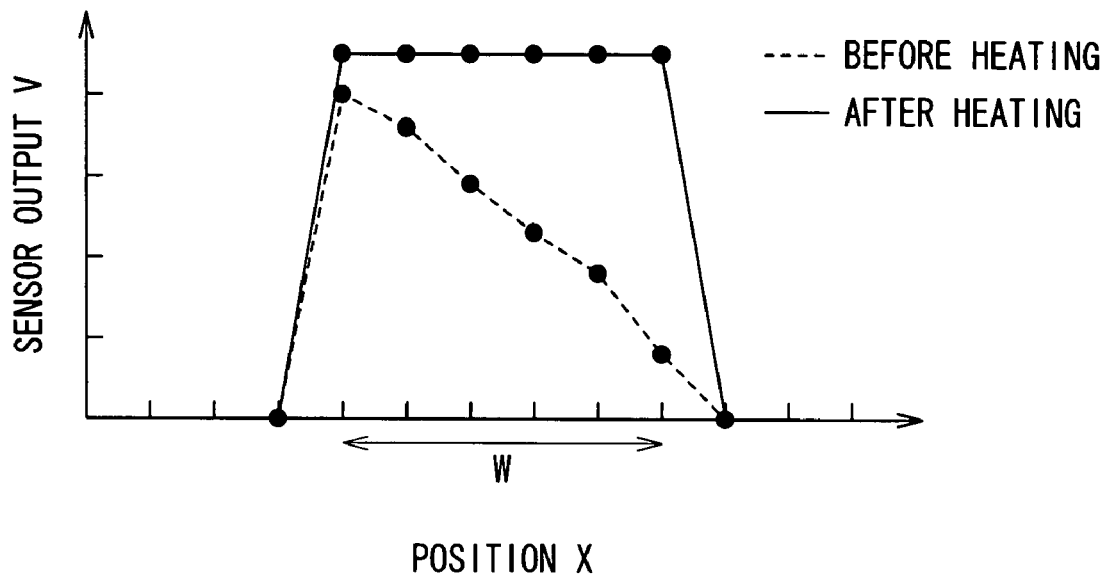
FIG. 7 is a relationship diagram showing a relationship between sensor output in a case that an air bearing surface has asperity and sensor output in a case that it does not have the asperity.

For example, it is known that when a master disk is prepared, the master disk having one projection 1A in a predetermined height at a predetermined point, then the head slider 20 is allowed to fly on the master disk while the master disk is rotated with linear velocity being constant, and a head slider 20, of which the flying height H2 is nonuniform in the track width direction, is moved in a radial direction of the magnetic disk 1, so that the projection 1A on the surface of the master disk is allowed to sequentially collide with six points in the end portion 22A of the air bearing surface 20A, output (sensitivity) of the sensor 23 significantly varies depending on a point with which the projection 1A on the surface of the magnetic disk 1 collides as shown by a dotted line in FIG. 7.

In this way, when variation occurs in sensitivity of the sensor 23, an error occurs in a measurement result of the glide height H1 due to such variation. Therefore, particularly when the head slider 20 is allowed to fly with a flying height of less than 4 nm, whether the magnetic disk 1 meets the specification of the glide height H1 is possibly hard to be checked if any measure is not performed.

However, in the embodiment, since the head slider 20 has the plurality of heaters 24 heating the end portion 22A of the air bearing surface 20A, and the plurality of leads 24B being connected to the plurality of heaters 24 respectively and isolated from one another, and furthermore the current control section 36 is provided, which supplies a current to each of the plurality of leads 24B based on the asperity information 37A corresponding to magnitude of the current to be supplied to each of the plurality of leads 24B, even if there is asperity in accordance with distribution of the recess amount D in the end portion 22A of the air bearing surface 20A, a current is supplied to each of the plurality of heaters 24 based on the asperity information 37A, and consequently a portion having the asperity can be planarized by heating the portion using the plurality of heaters 24. Thus, since the flying height H2 of the head slider 20 becomes uniform in the track width direction, possibility that output (sensitivity) of the sensor 23 varies depending on a point in the air bearing surface 20A with which the projection collides is eliminated.

For example, it is known that when a master disk is prepared, the master disk having one projection 1A in a predetermined height at a predetermined point, then the head slider 20 is allowed to fly on the master disk while the master disk is rotated with linear velocity being constant, and a current is supplied to each of the plurality of heaters 24 based on the asperity information 37A to heat the end portion 22A of the air bearing surface 20A, and then the projection 1A on a surface of the master disk is allowed to sequentially collide with heated regions heated by the plurality of heaters 24 in the air bearing surface 20A, output (sensitivity) of the sensor 23 is approximately uniform irrespective of a point with which the projection 1A on the surface of the master disk collides as shown by a solid line in FIG. 7.

In this way, in the embodiment, since sensitivity of the sensor 23 is made approximately uniform, glide height H1 can be accurately checked.

Moreover, in the embodiment, since the heaters 24 are provided in the end portion 22A on the trailing edge of the air bearing surface 20A in a direction of track width, and arranged along the air bearing surface 20A, width of a planarized region in the end portion 22A on the trailing edge of the air bearing surface 20A can be freely changed. Thus, an area in the magnetic disk 1 that can be checked in one scan can be easily increased.

Modification of First Embodiment

Figure 8:
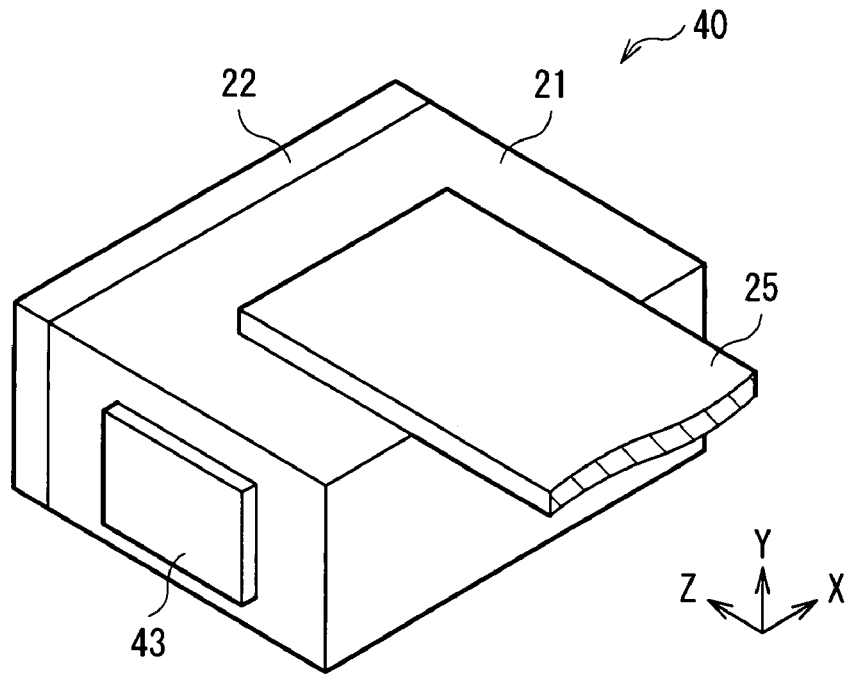
FIG. 8 is a perspective diagram of a head slider according to a modification.
Figure 9:
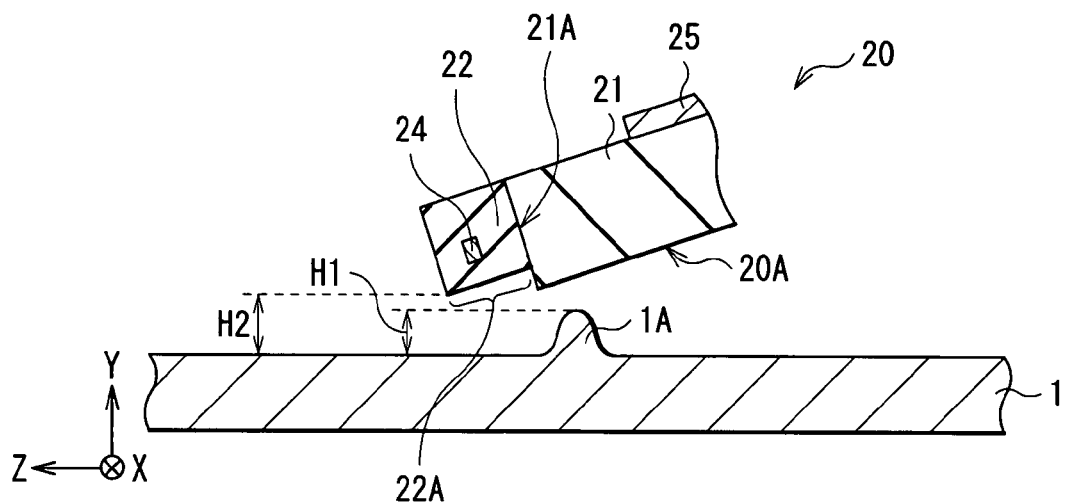
FIG. 9 is a sectional configuration diagram of the head slider of FIG. 8
Figure 10:
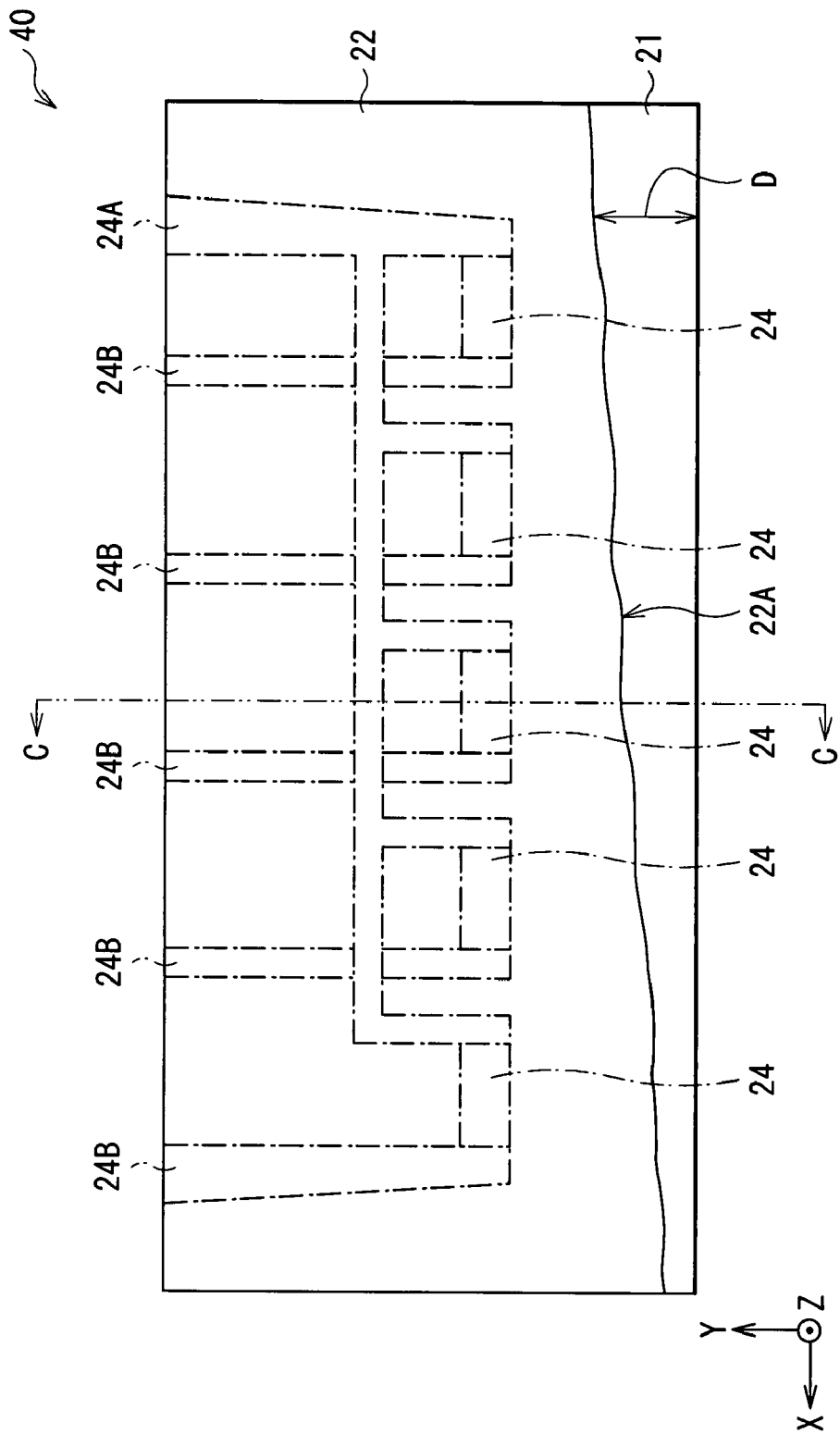
FIG. 10 is a plane diagram of a side face of the head slider of FIG. 8.
Figure 11:
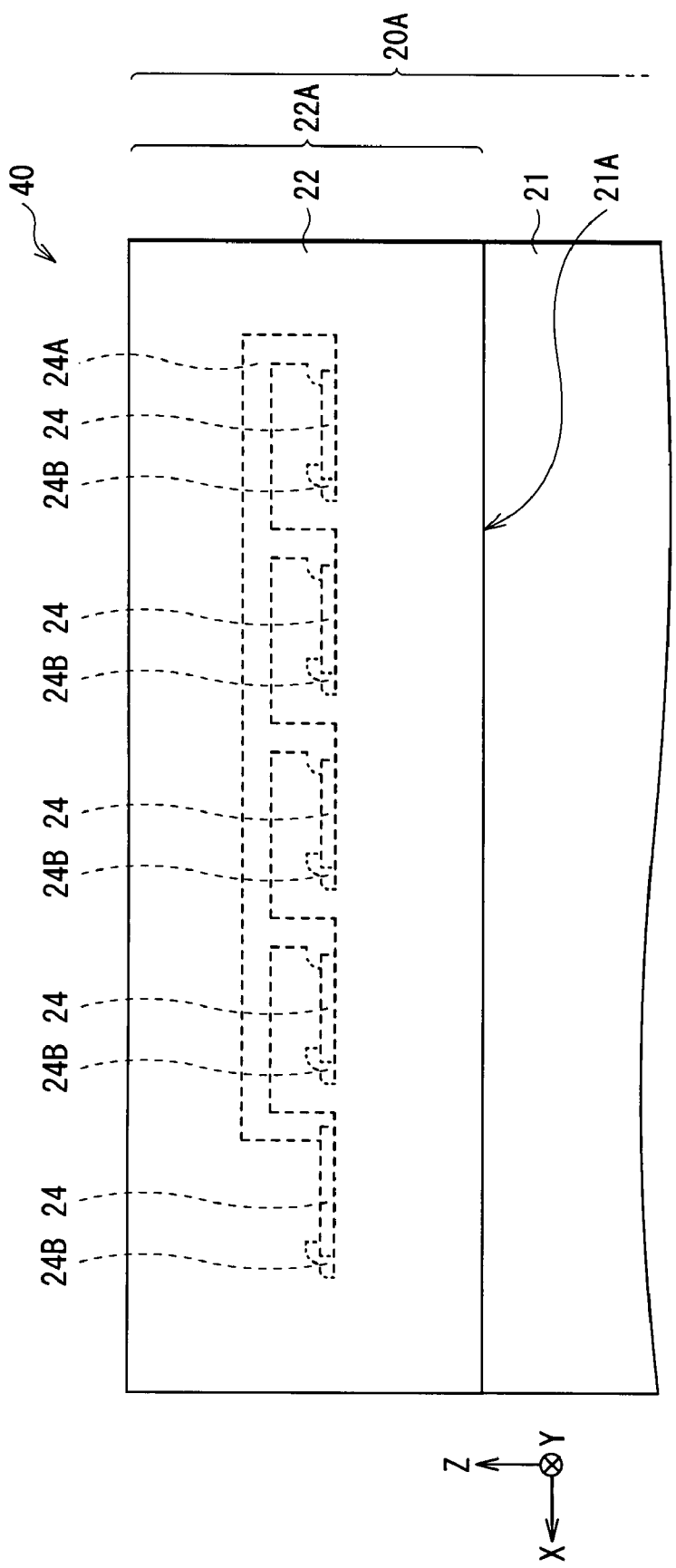
FIG. 11 is a plane diagram of a bottom of the head slider of FIG. 8.
Figure 12:
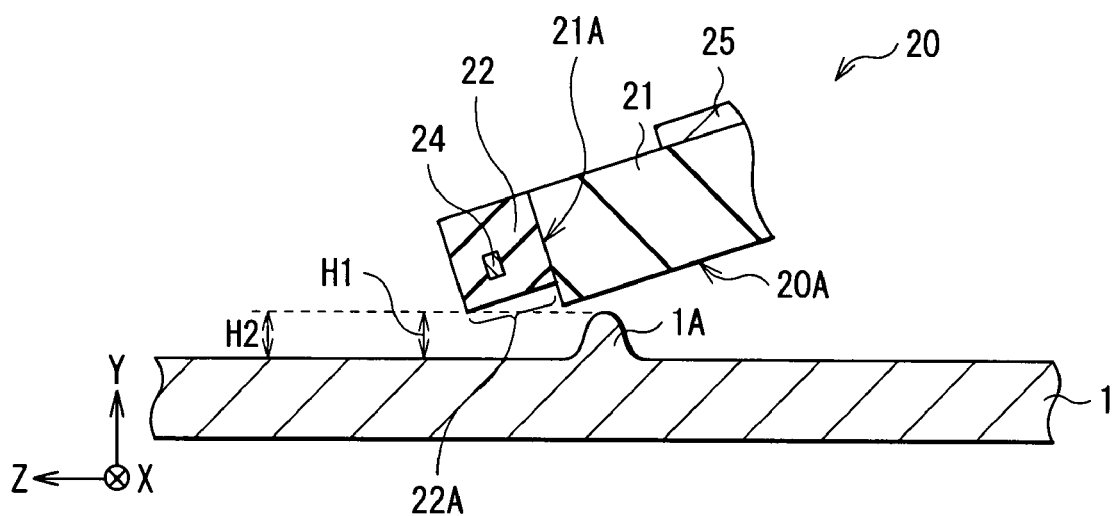
FIG. 12 is a sectional configuration diagram of the head slider of FIG. 8 when a heater is heated.
Figure 13:
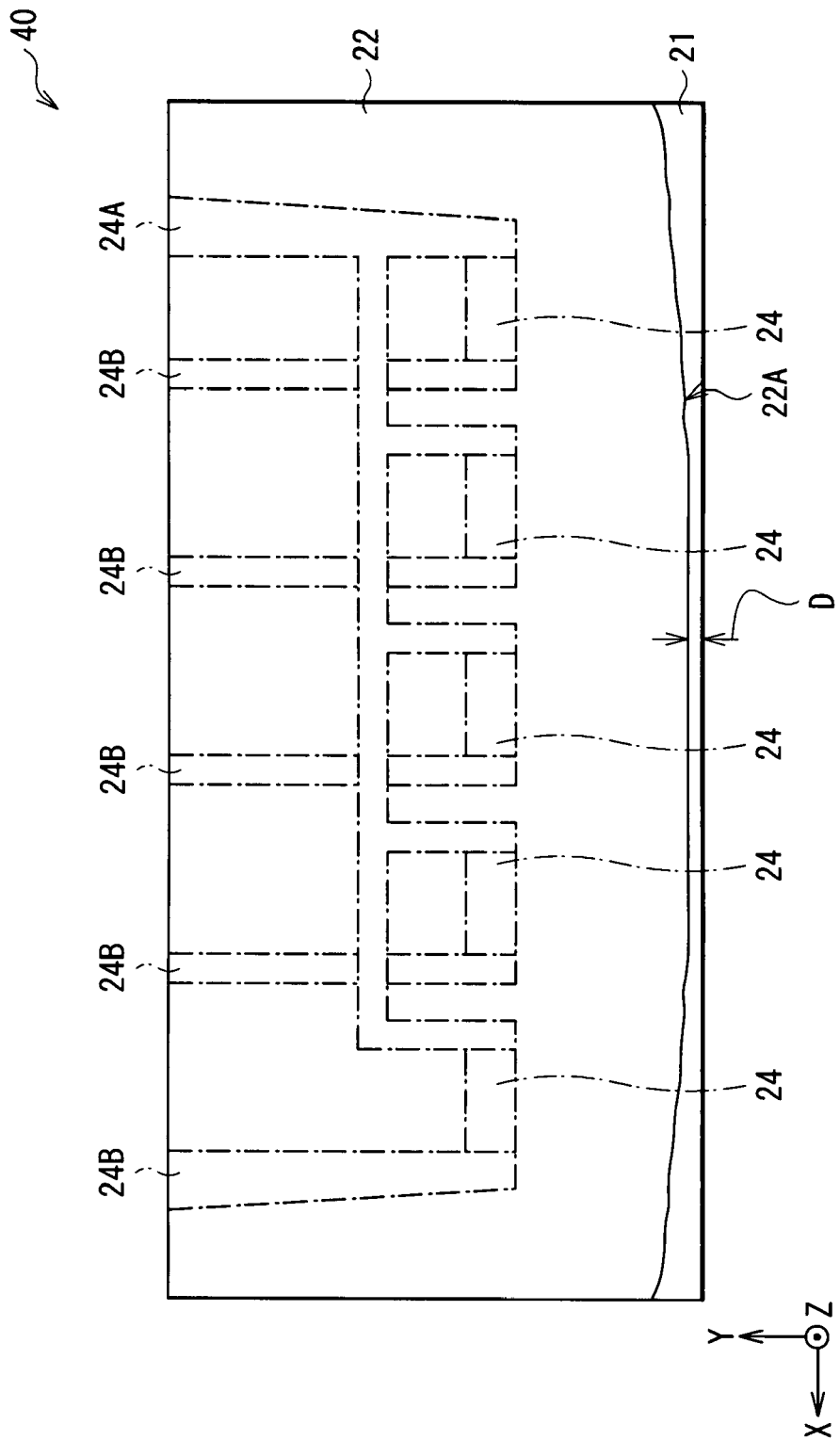
FIG. 13 is a plane diagram of a side face of the head slider of FIG. 12.

While the sensor 23 is incorporated within the overcoat layer 22 in the embodiment, it may be provided outside the overcoat layer 22. For example, a sensor 43 can be provided on a side face of a slider base 21 as shown in a head slider 40 of FIG. 8. In this case, while only heaters 24 are incorporated within the overcoat layer 22 as shown in FIGS. 9 to 11, even if there is asperity in accordance with distribution of the recess amount D in the end portion 22A of the air bearing surface 20A as shown in FIGS. 12 and 13, a current is supplied to each of the plurality of heaters 24 based on the asperity information 37A, and a portion having the asperity can be planarized by heating the portion using the plurality of heaters 24. Thus, since the flying height H2 of the head slider 20 becomes uniform in the track width direction, possibility that output (sensitivity) of the sensor 23 varies depending on a point in the air bearing surface 20A with which the projection collides is eliminated.

Second Embodiment

Next, a second embodiment of the invention is described. A glide height checking apparatus 40 of the embodiment is mainly different from the glide height checking apparatus 10 of the above embodiment, which has the plurality of heaters 24, in that the apparatus 40 has a single heater 24. Thus, hereinafter, configurations, operation and effects being common to those in the above embodiment are appropriately omitted to be described, and different points from the above embodiment are mainly described.

Figure 14:
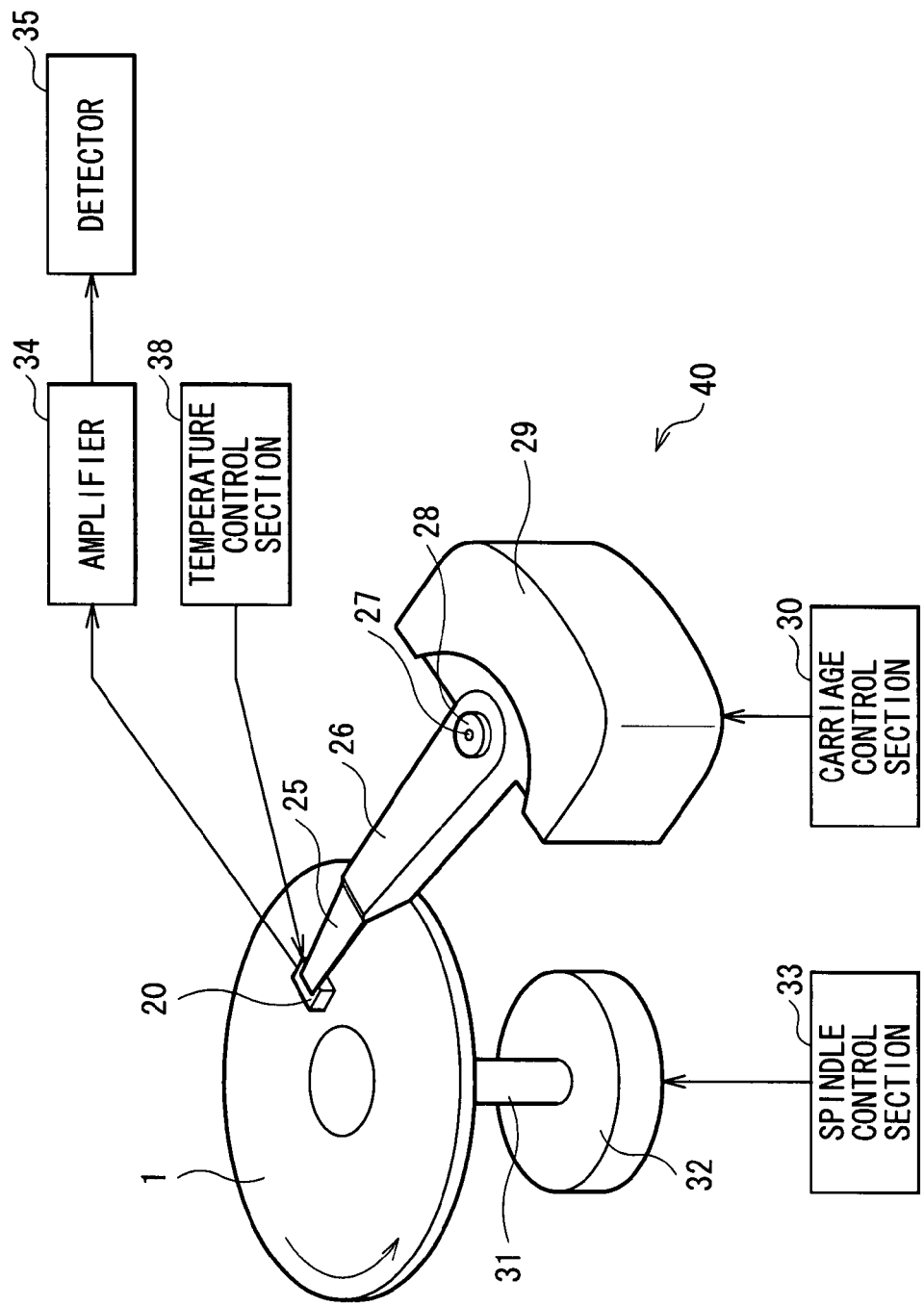
FIG. 14 is a schematic block diagram of a glide height checking apparatus according to a second embodiment of the invention.
Figure 15:
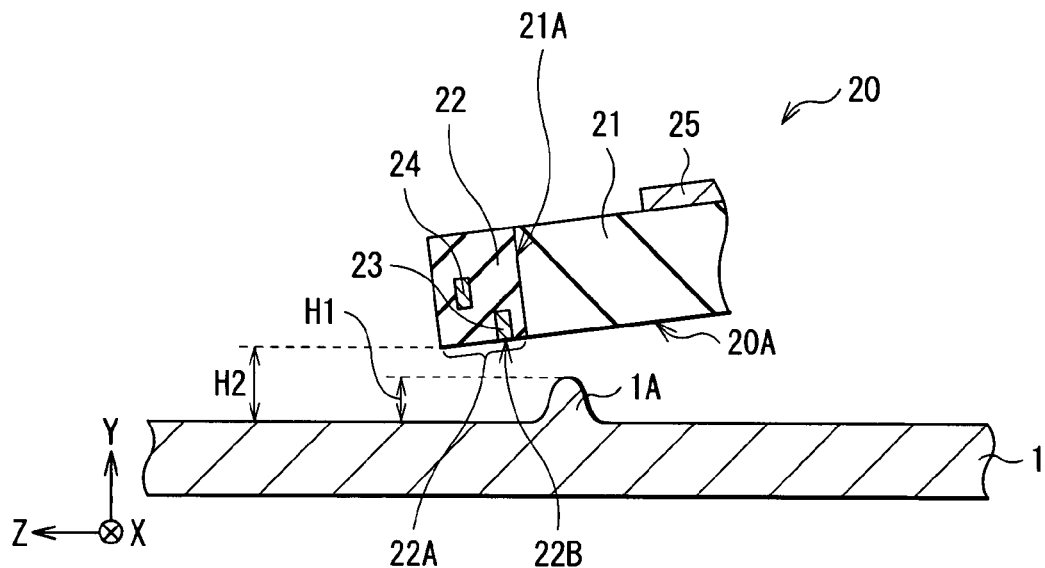
FIG. 15 is a sectional configuration diagram of a head slider in FIG. 14.
Figure 16:
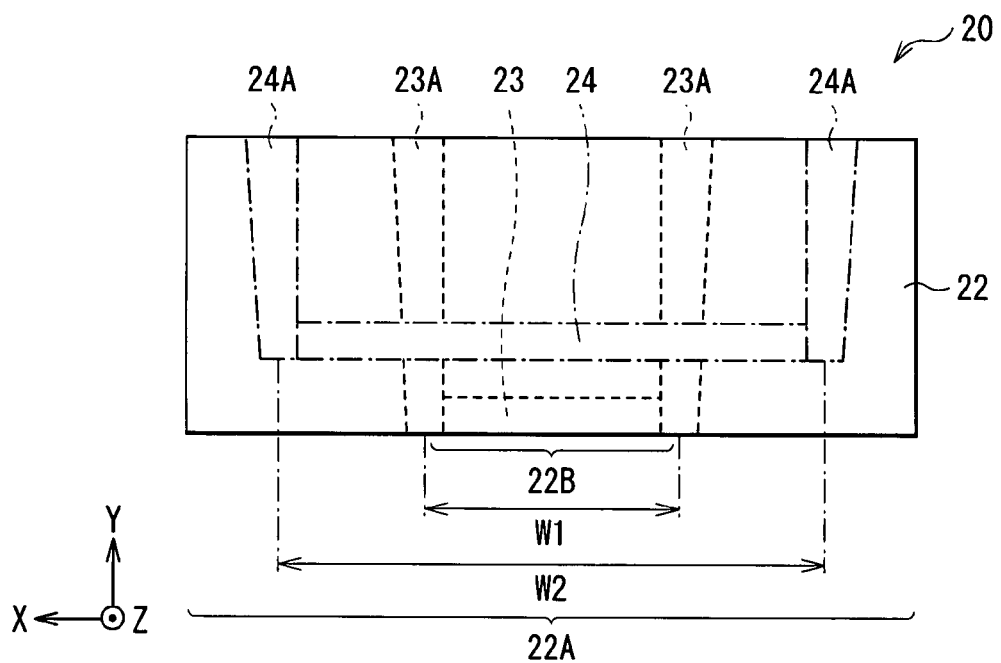
FIG. 16 is a plane diagram of a side face of the head slider in FIG. 14.
Figure 17:
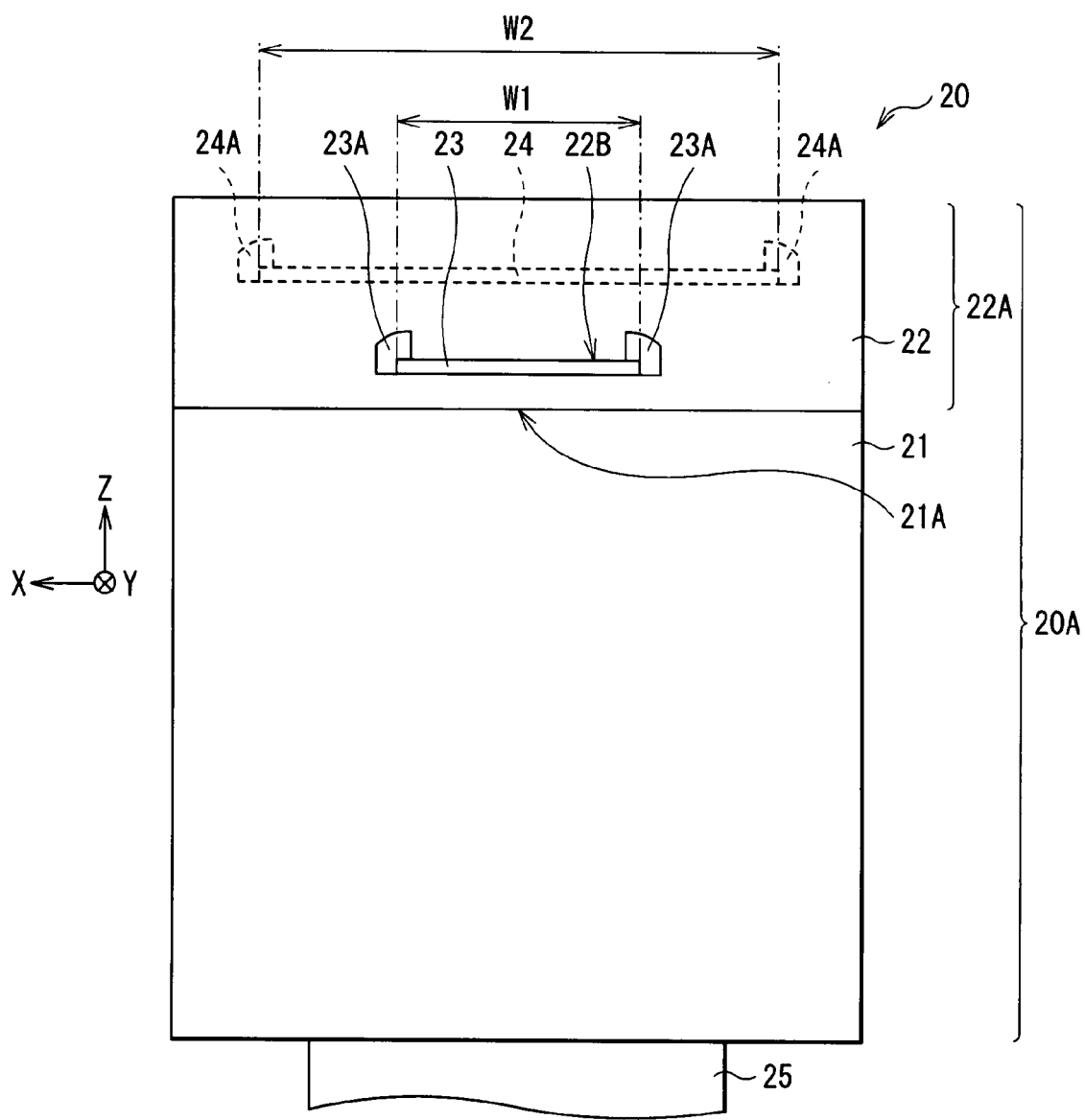
FIG. 17 is a plane diagram of a bottom of the head slider in FIG. 14.
Figure 18:
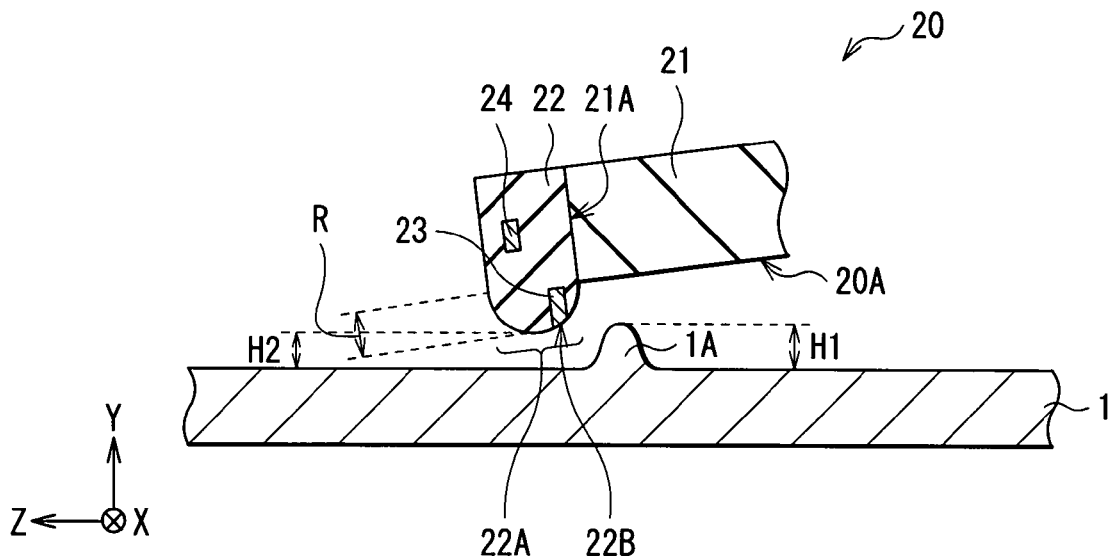
FIG. 18 is a sectional configuration diagram of the head slider when a heater is heated.
Figure 19:
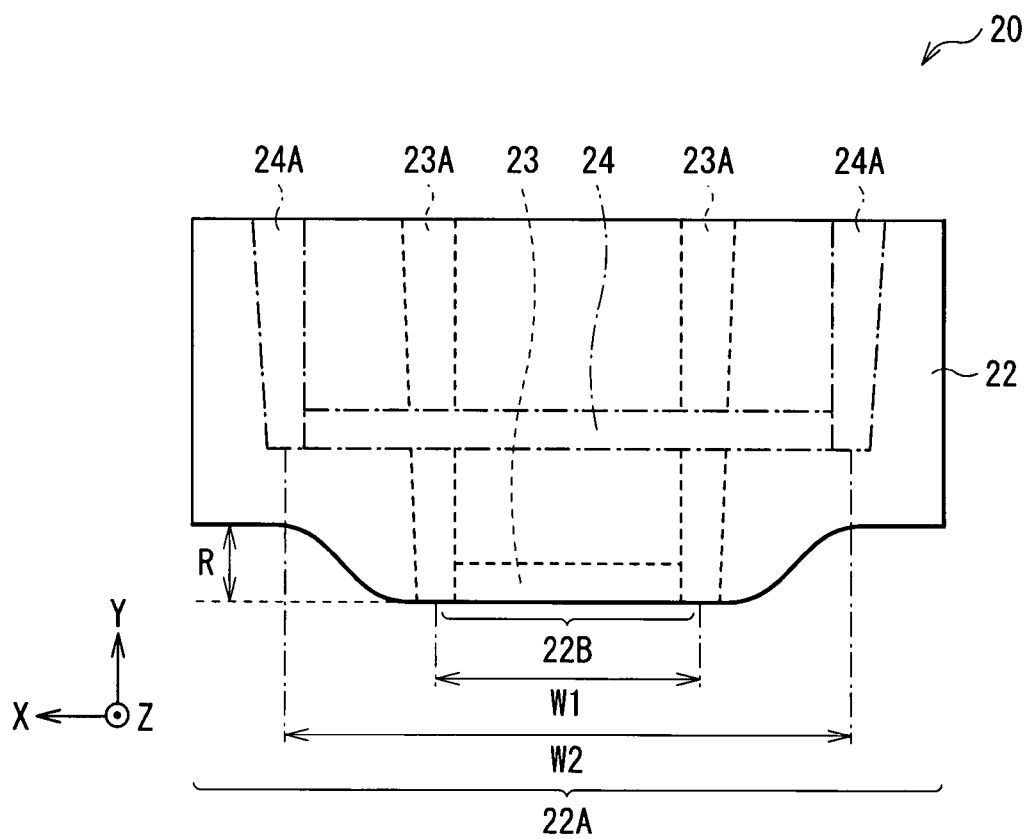
FIG. 19 is a plane diagram of a side face of the head slider of FIG. 18.
Figure 20:
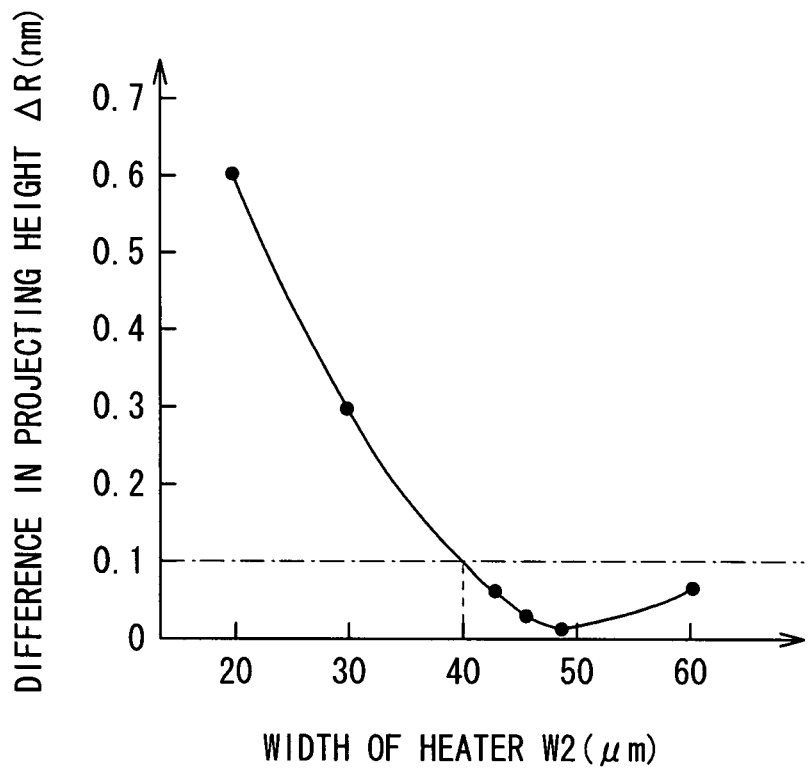
FIG. 20 is a relationship diagram showing a relationship between heater width and difference in projecting height.

FIG. 14 shows a schematic configuration of a glide height checking apparatus 40 of the embodiment. FIGS. 15 and 18 show sectional configurations in a ZY plane of the head slider 20 respectively. FIGS. 16 and 19 are diagrams of the end portion 22A of the head slider 20 when it is seen from a rotational direction (Z axis direction) of the magnetic disk 1, respectively. FIG. 17 shows a planar configuration of the head slider 20 at the air bearing surface 20A side in an expanded manner. Here, FIGS. 15 to 17 show appearance when a heater 24 described later is not heated, and FIGS. 18 to 19 show appearance when the heater 24 is heated, respectively.

As shown in FIGS. 15 to 17, the head slider 20 has a slider base 21, and an overcoat layer 22 formed on an end face (end face 21A on the trailing edge) at a negative side of a Z axis of the slide base 21. A sensor 23 and a heater 24 are incorporated within the overcoat layer 22.

A surface at an air bearing surface 20A side of the overcoat layer 22 is preferably flat in the same level as a surface at the air bearing surface 20A side of the slider base 21. Moreover, the surface at the air bearing surface 20A side of the overcoat layer 22 is preferably formed in the same plane as the surface at the side of the air bearing surface 20A of the slider base 21, however, it can be slightly recessed with respect to the surface at the side of the air bearing surface 20A of the slider base 21.

The heater 24 includes NiCu, NiCr, Ta, TiW or the like. The heater 24 is configured in a manner of extending in a track width direction, and provided in an end portion 22A of the air bearing surface 20A (see FIGS. 15 and 17). That is, the heater 24 and the sensor 23 are disposed parallel to each other. The heater 24 is connected with leads 24A and 24A (see FIGS. 16 and 17) at both ends, and applied with power from a temperature control section 37 via the leads 24A and 24A. Thus, the heater 24 converts part of power supplied via the leads 24A and 24A into heat and thereby generates heat, and heats the end portion 22A of the air bearing surface 20A by the heat, in addition, thermally expands such a heated region, and consequently projects the end portion 22A of the air bearing surface 20A to a surface of the magnetic disk 1 as shown in FIGS. 18 to 19.

While the heater 24 is disposed away from the end face 21A on the trailing edge compared with the sensor 23, and disposed away from the air bearing surface 20A compared with the sensor 23 in FIGS. 15 to 19, the heater 24 need not be always disposed in such a position, and the heater 24 can be disposed in a position where when the heater 24 is heated, the end portion 22A of the air bearing surface 20A can be projected due to thermal expansion, as shown in FIGS. 18 and 19. For example, the heater 24 may be disposed in the same distance as the sensor 23 from the end face 21A on the trailing edge or closer to the end face 21A, or may be disposed near the air bearing surface 20A.

In the heater 24, calorific power per unit length is uniform in the track width direction of the heater 24. Therefore, when the heater 24 is heated, temperature of the end portion 22A of the air bearing surface 20A is gradually decreased from a central region to an outer edge region in the track width direction, however, temperature of the central region is approximately uniform. Thus, in the embodiment, width W2 (see FIGS. 16, 17 and 19) in the track width direction of the heater 24 is in a length such that when the heater 24 is heated, at least a portion facing the sensor 23 in the end portion 22A (sensor-facing portion 22B, see FIGS. 15 to 19) has uniform temperature distribution. Thus, since projecting height R (see FIGS. 18 and 19) due to thermal expansion of the sensor-facing portion 22B becomes even in the track width direction, a distance (flying height H2, see FIG. 18) between the sensor-facing portion 22B and the surface of the magnetic disk 1 becomes uniform in the track width direction.

For example, when width W1 of the sensor 23 is made to be 30 μm, the width W2 of the heater 24 is made to be 40 μm or more (at least 1.3 times as large as the width W1 of the sensor 23), thereby vertical unevenness (difference ΔR) in the track width direction of the sensor-facing portion 22B can be made 0.1 nm or less. Thus, since variation in flying height H2 can be made 0.1 nm or less in the track width direction, variation in flying height H2 can be substantially neglected with regard to a specification of the glide height H1.

Figure 21:
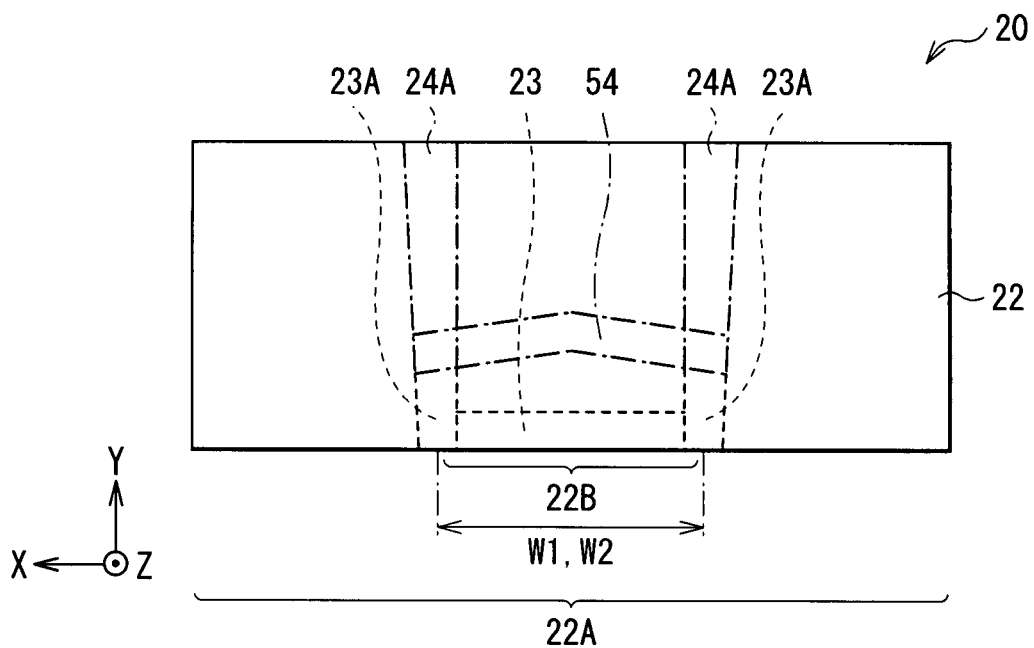
FIG. 21 is a plane diagram of a side face of a head slider according to a modification.
Figure 22:
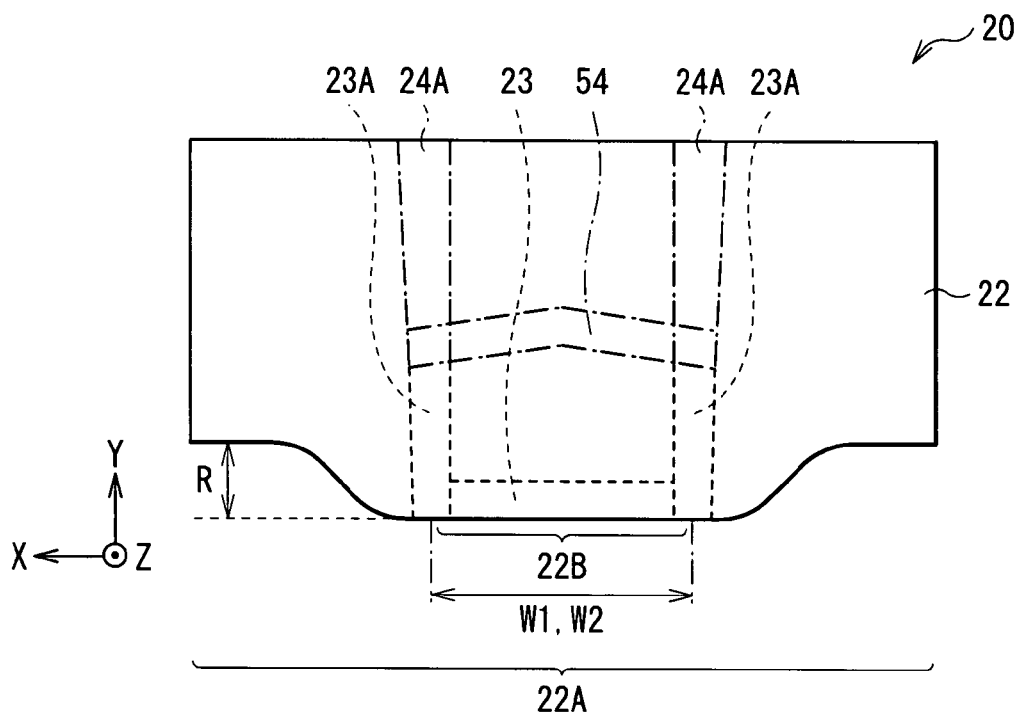
FIG. 22 is a plane diagram of a side face of the head slider of FIG. 21 when a heater is heated.

However, an aspect that when the heater 24 is heated, temperature distribution in at least the sensor-facing portion 22B is made uniform is not limited to the above example, and for example, a central portion of a heater 54 may be disposed away from the sensor-facing portion 22B compared with end portions as shown in FIG. 21. Thus, since temperature of a central portion of the sensor-facing portion 22B is decreased, temperature distribution in the sensor-facing portion 22B becomes uniform in the track width direction. As a result, since projecting height R due to thermal expansion of the sensor-facing portion 22B becomes even in the track width direction as shown in FIG. 22, the flying height H2 (see FIG. 18) of the sensor-facing portion 22B becomes uniform in the track width direction.

Figure 23:
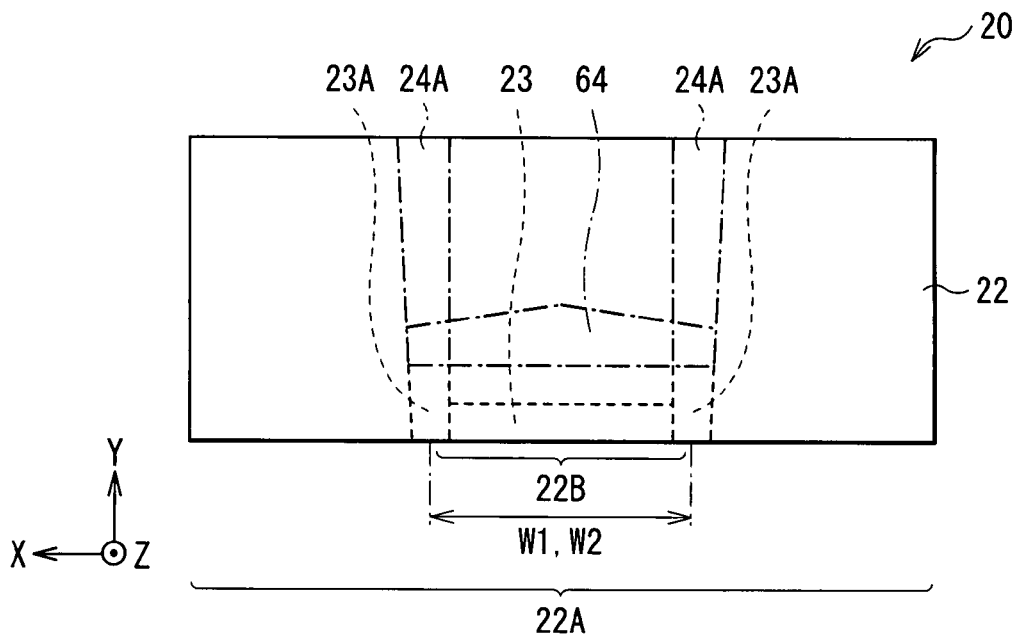
FIG. 23 is a plane diagram of a side face of a head slider according to still another modification.
Figure 24:
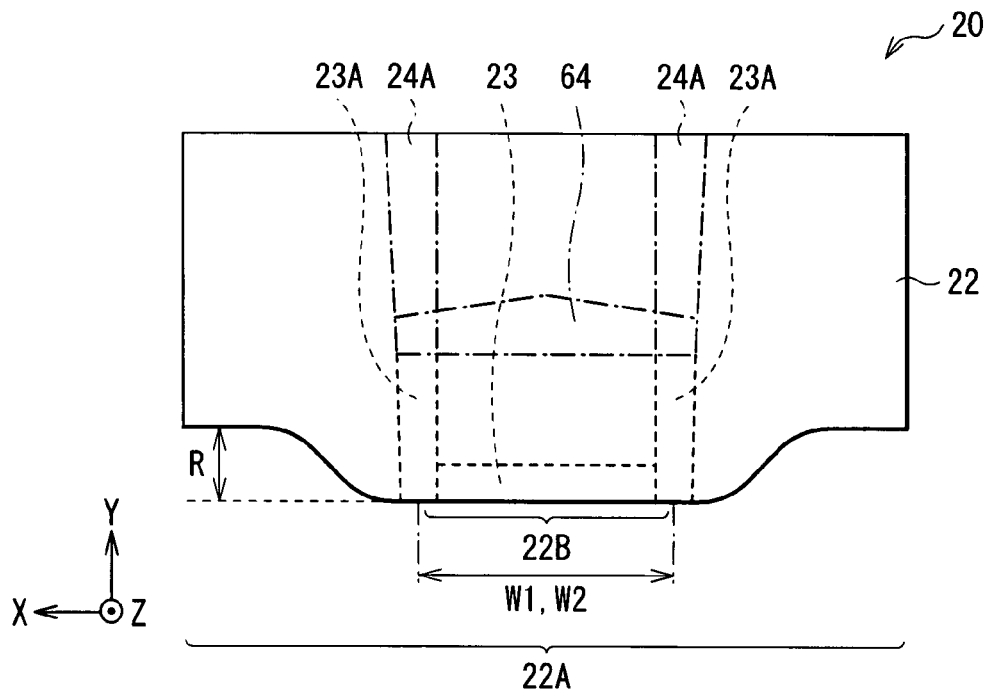
FIG. 24 is a plane diagram of a side face of the head slider of FIG. 23 when a heater is heated.
Figure 25:
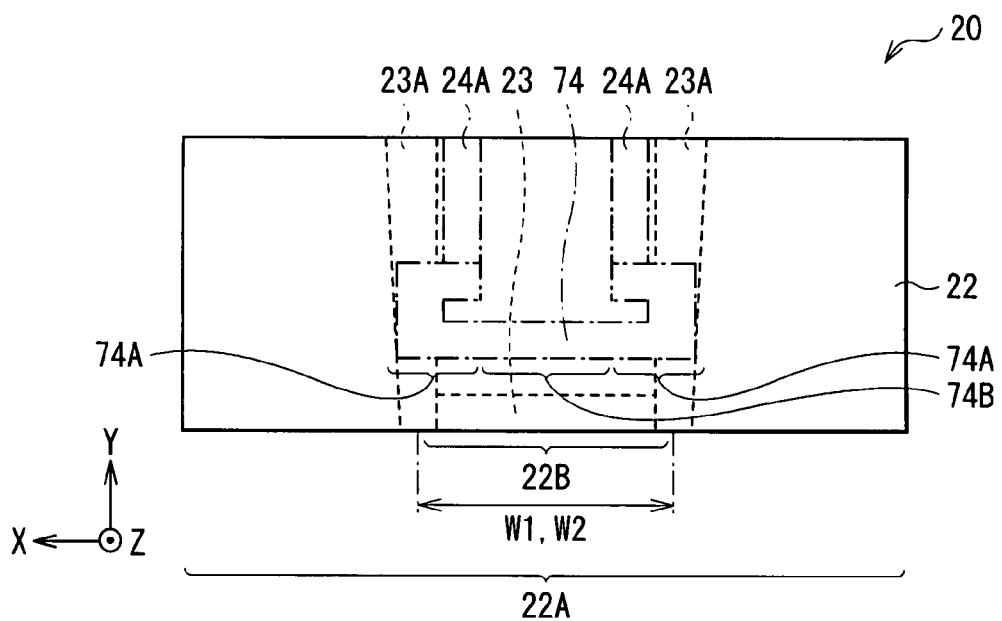
FIG. 25 is a plane diagram of a side face of a head slider according to still another modification.
Figure 26:
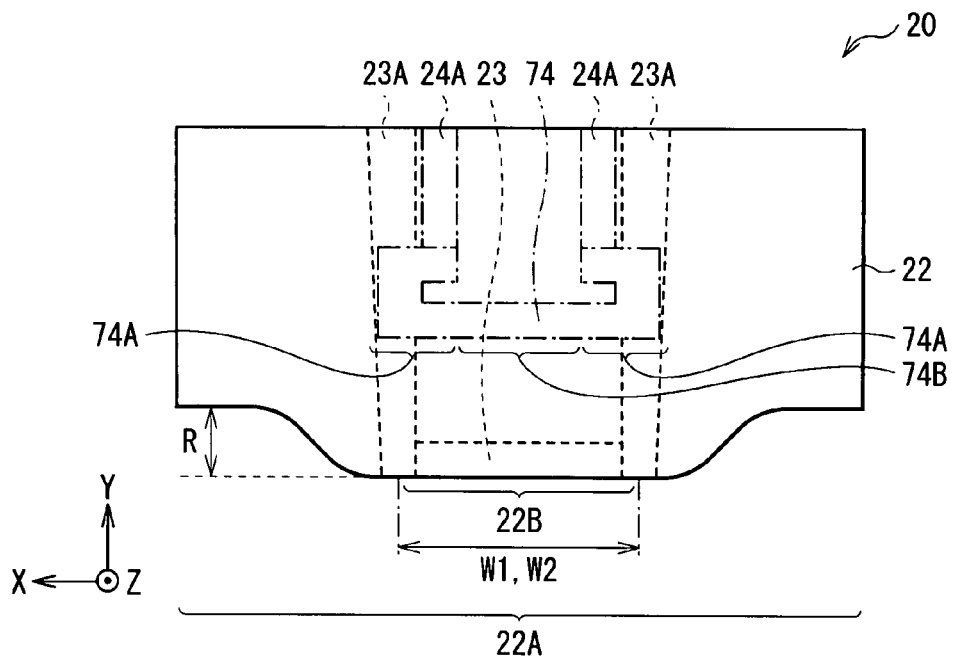
FIG. 26 is a plane diagram of a side face of the head slider of FIG. 25 when a heater is heated.
Figure 27:
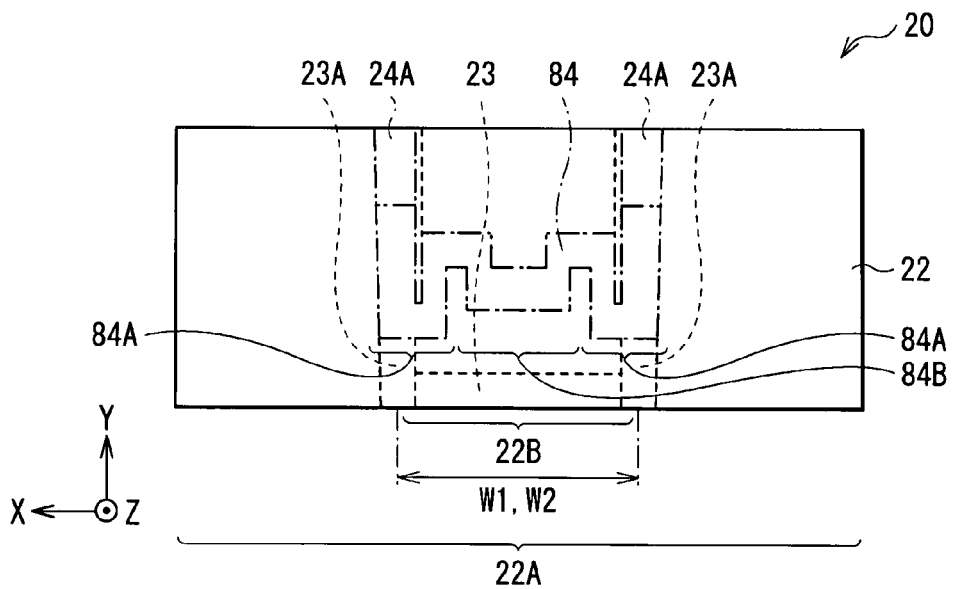
FIG. 27 is a plane diagram of a side face of a head slider according to still another modification.
Figure 28:
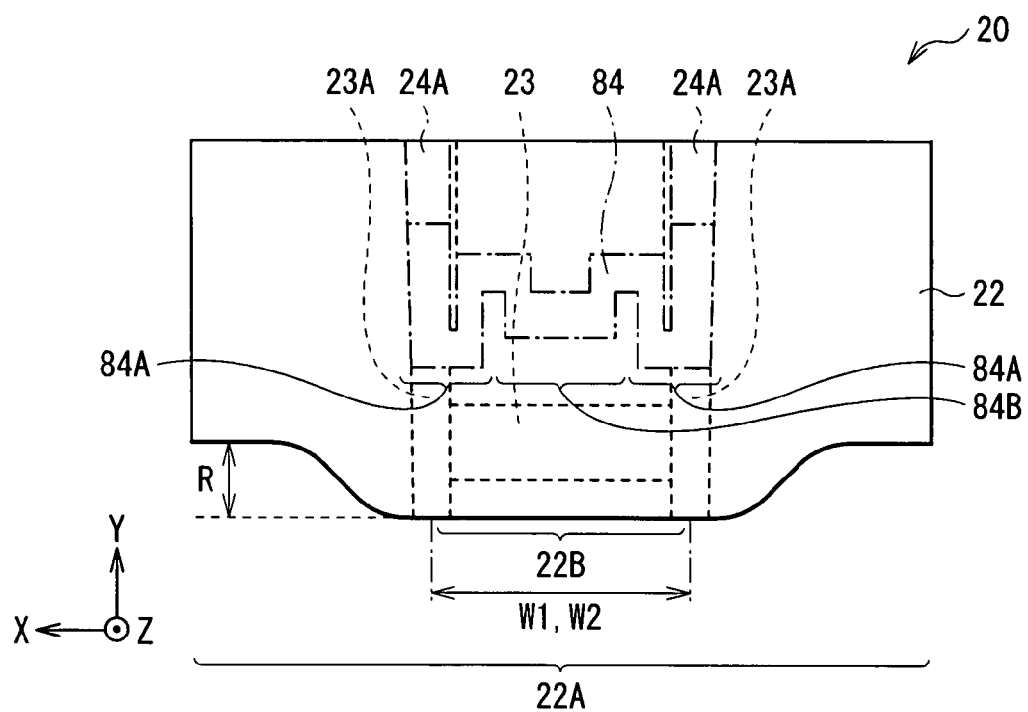
FIG. 28 is a plane diagram of a side face of the head slider of FIG. 27 when a heater is heated.

Moreover, for example, as shown in FIG. 23, section area of a central portion of a heater 64 may be increased compared with section area of each of end portions, or as shown in FIGS. 25 and 27, a current path of a heater 74 or 84 may be disposed relatively densely in portions 74A or 84A corresponding to end portions of the sensor-facing portion 22B, and may be disposed relatively thinly in a portion 74B or 84B corresponding to a central portion of the sensor-facing portion 22B. Thus, calorific power of the portions 74A or 84A corresponding to the end portions of the sensor-facing portion 22B becomes larger than calorific power of the portion 74B or 84B corresponding to the central portion of the sensor-facing portion 22B, so that temperature of the end portions of the sensor-facing portion 22B is increased, therefore temperature distribution in the sensor-facing portion 22B becomes uniform in the track width direction. As a result, as shown in FIGS. 24, 26 and 28, since projecting height R due to thermal expansion of the sensor-facing portion 22B becomes even in the track width direction, the flying height H2 (see FIG. 18) of the sensor-facing portion 22B becomes uniform in the track width direction.

While the width W2 of the heater 64 is equal to the width W1 of the sensor 23 in the aspect shown in FIGS. 21 to 28, when the width W2 of the heater 64 is made longer than the width W1 of the sensor 23, width of a portion, in which the projecting height R due to thermal expansion is even in the track width direction, is larger than width of the sensor-facing portion 22B.

In the glide height checking apparatus 40 of the embodiment, the spindle motor 32 is driven to rotate the magnetic disk 1 to induce airflow accompanying rotation of the magnetic disk 1. Then, flying force is generated on the air bearing surface 20A of the head slider 20, and the head slider 20 begins to fly from the magnetic disk 1. Then, the head slider 20 is stabilized at a flying height H2 at which the flying force is balanced with resultant force (pressing load) of gravity of the head slider 20 and spring load of the suspension 25.

At that time, the flying height H2 of the head slider 20 is required to be equal to the specification of glide height H1 (see FIGS. 15 and 18) to be detected in order to check whether the glide height H1 meets the specification or not. However, typically, since a profile of the air bearing surface 20A (see FIGS. 15, 17 and 18) of the head slider 20 varies among individuals due to processing accuracy, the profile of the air bearing surface 20A is subtly different for each head slider 20. Similarly, since a shape or property of the suspension 25 varies among individuals, a pitch angle or spring load is also subtly different for each suspension 25.

Therefore, when variation in flying height among individuals due to subtle difference in flying force or pressing load is assumed to be ±Δa (nm), in the case that a specification of the glide height H1 is, for example, 3 nm, flying height H2 needs to be set to be, for example, (3+Δa) nm so as to prevent the head slider 20 from contacting to a projection 1A having a height lower than 3 nm by mistake. Therefore, when Δa is so large that it is not negligible compared with the specification of the glide height H1, whether the magnetic disk 1 meets the specification of the glide height H1 or not is typically hard to be checked.

However, in the embodiment, since the heater 24 is provided in the end portion 22A of the air bearing surface 20A, and configured in a manner of extending in a predetermined length in the track width direction in the end face 21A on the trailing edge (see FIGS. 15, 17 and 18), the heater 24 can be heated to adjust the projecting height R of the air bearing surface 20A. Thus, the variation ±Δa in flying height H2 among individuals as above can be absorbed by adjusting the projecting height R, consequently the head slider 20 can be allowed to accurately fly with a low flying height of, for example, less than 4 nm. Therefore, obviously in the case that the specification of the glide height H1 is 4 nm or more, in addition, even if the specification of glide height H1 is so small that it is less than 4 nm, whether the magnetic disk 1 meets the specification of the glide height H1 or not can be accurately checked.

Figure 29:
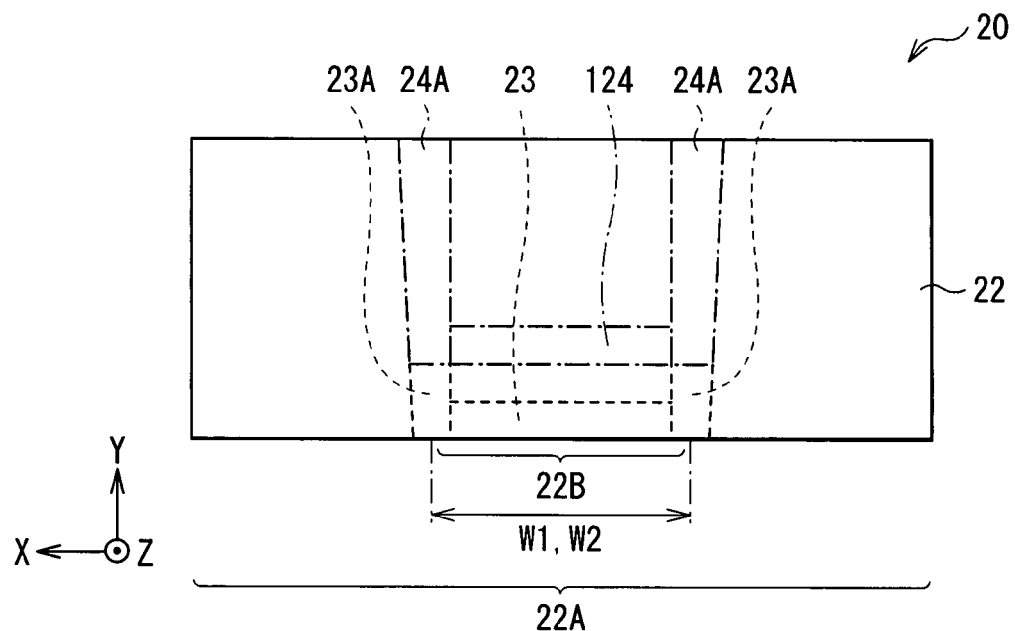
FIG. 29 is a plane diagram of a side face of a head slider according to a comparative example.
Figure 30:
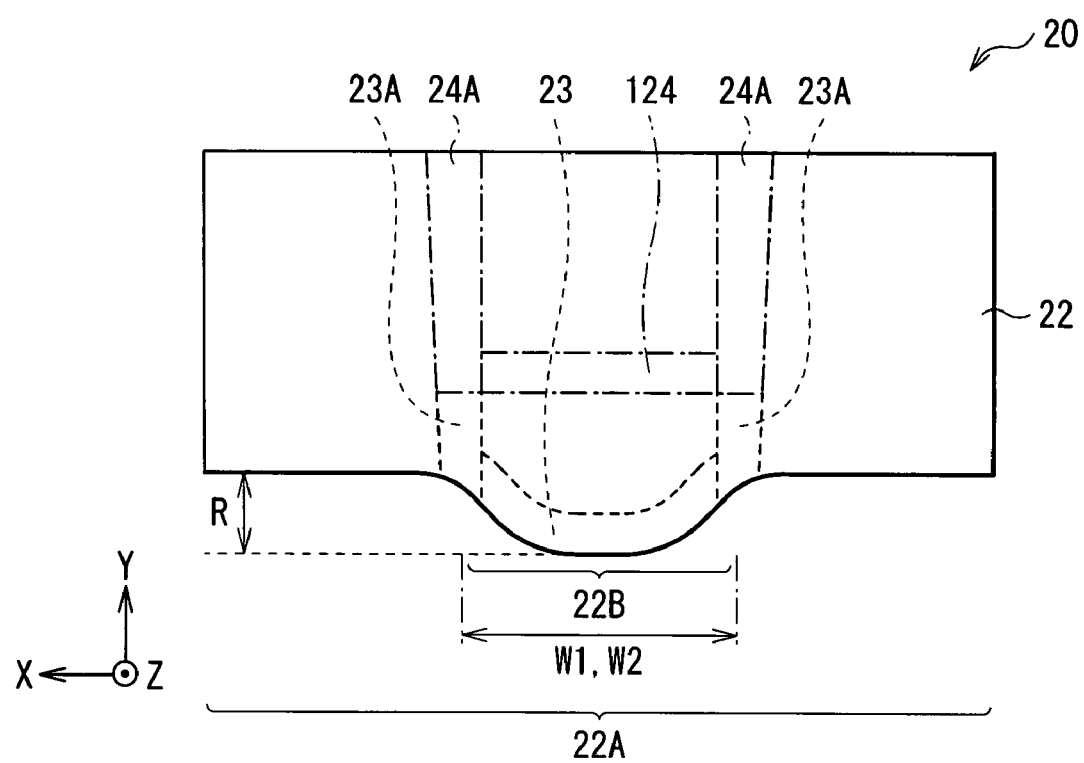
FIG. 30 is a plane diagram of a side face of the head slider of FIG. 29 when a heater is heated.

In the case that a heater 124 is provided in the end portion 22A of the air bearing surface 20A, and configured in a manner of extending in a predetermined length in the track width direction in the end face 21A on the trailing edge, for example, when width of the heater 124 is made equal to width of the sensor 23 as shown in FIG. 29, the projecting height R due to thermal expansion of the sensor-facing portion 22B becomes nonuniform in the track width direction as shown in FIG. 30. Therefore, a distance (flying height H2) between the sensor-facing portion 22B and the surface of the magnetic disk 1 also becomes nonuniform in the track width direction, as a result, an area in the magnetic disk 1 that can be checked in one scan is extremely reduced.

However, in the embodiment, since the width W2 (see FIGS. 16, 17 and 19) of the heater 24 is in a length such that when the heater 24 is heated, at least the sensor-facing portion 22B has uniform temperature distribution in the track width direction, the projecting height R due to thermal expansion of the sensor-facing portion 22B can be made uniform in the track width direction. Thus, since the distance (flying height H2, see FIG. 18) between the sensor-facing portion 22B and the surface of the magnetic disk 1 can be made uniform in the track width direction, a wide area in the magnetic disk 1 can be checked in one scan. Moreover, the width of the heater 24 is adjusted, thereby an area in the magnetic disk 1 that can be checked in one scan can be easily increased.

Moreover, in the case that the heater 54 is provided along the sensor-facing portion 22B, and the central portion of the heater 54 is disposed away from the air bearing surface 20A compared with the end portions as shown in FIG. 21, or in the case that the heater 64 is provided along the sensor-facing portion 22B, and section area of the central portion of the heater 64 is increased compared with section area of each of end portions as shown in FIG. 23, or in the case that the heater 74 or 84 is provided along the sensor-facing portion 22B, and the current path of the heater 74 or 84 is disposed relatively densely in the portions 74A or 84A corresponding to end portions of the sensor-acing portion 22B, and is disposed relatively thinly in the portion 74B or 84B corresponding to the central portion of the sensor-facing portion 22B as shown in FIGS. 25 and 28, temperature distribution in the sensor-facing portion 22B can be made uniform in the track width direction. Thus, since temperature distribution in the sensor-facing portion 22B can be made uniform in the track width direction, the projecting height R of the sensor-facing portion 22B can be made uniform in the track width direction as shown in FIGS. 22, 24, 26 and 28. Thus, since a distance (flying height H2) between the sensor-facing portion 22B and the surface of the magnetic disk 1 can be made uniform in the track width direction, a wide area in the magnetic disk 1 can be checked in one scan. Moreover, width of the heater 54, 64, 74 or 84 is adjusted, thereby an area in the magnetic disk 1 that can be checked in one scan can be easily increased.

Modification of Second Embodiment

Figure 31:
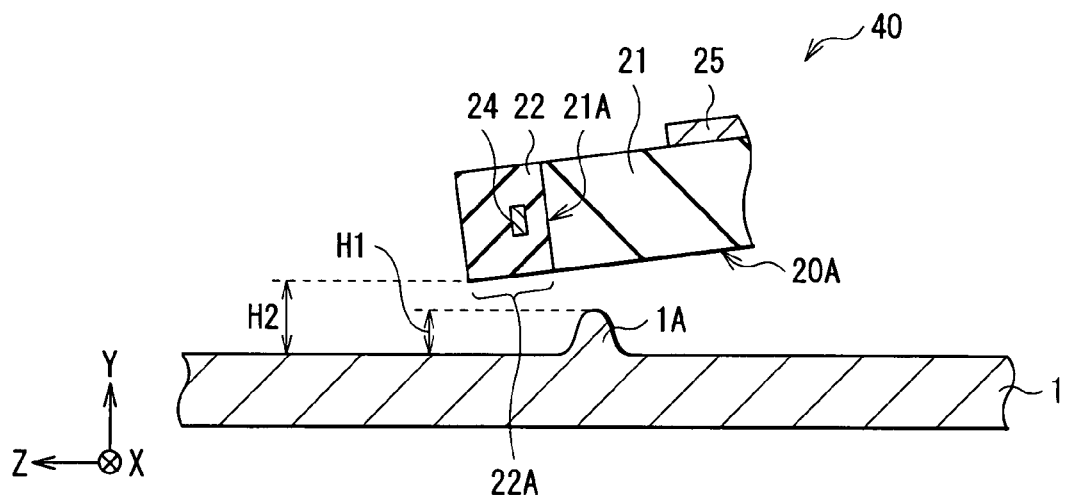
FIG. 31 is a sectional configuration diagram of the head slider of FIG. 8.
Figure 32:
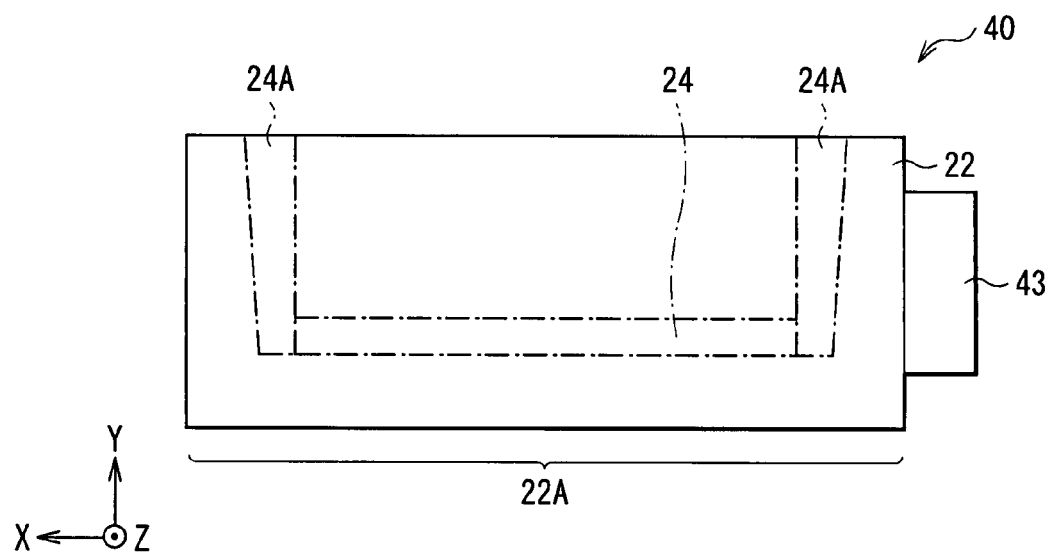
FIG. 32 is a plane diagram of a side face of the head slider of FIG. 8.
Figure 33:
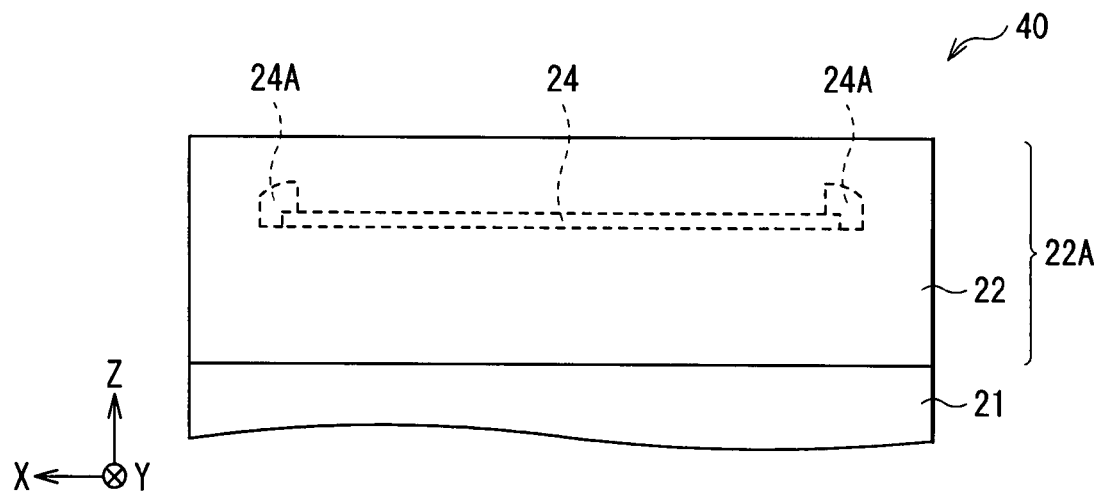
FIG. 33 is a plane diagram of a bottom of the head slider of FIG. 8.
Figure 34:
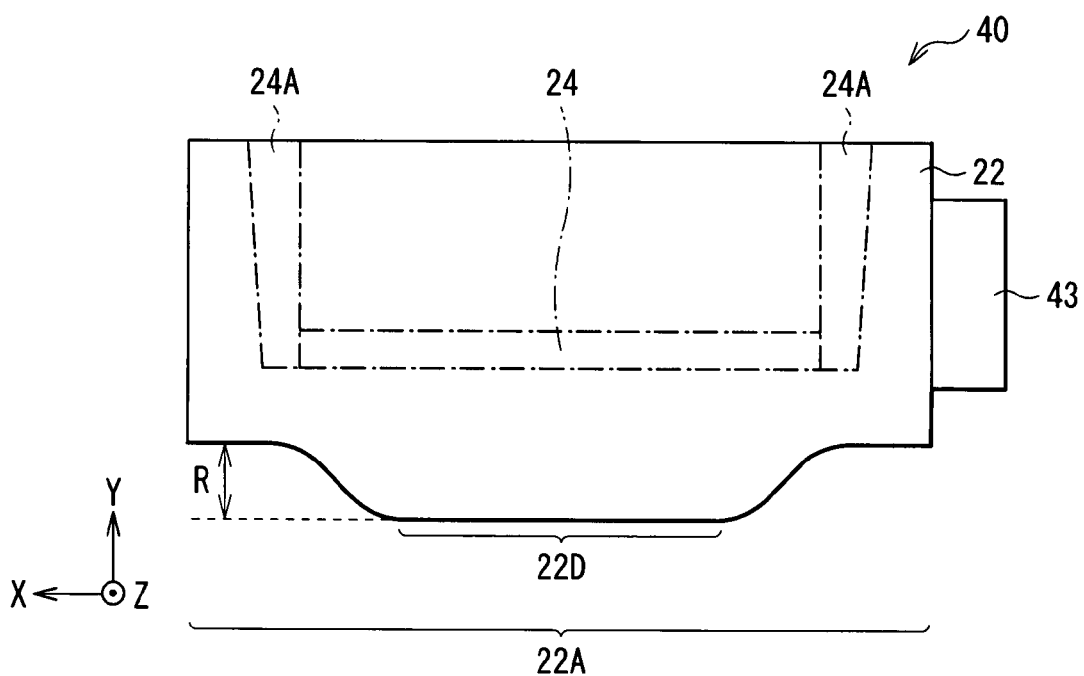
FIG. 34 is a plane diagram of a side face of the head slider of FIG. 8 when a heater is heated.
Figure 35:
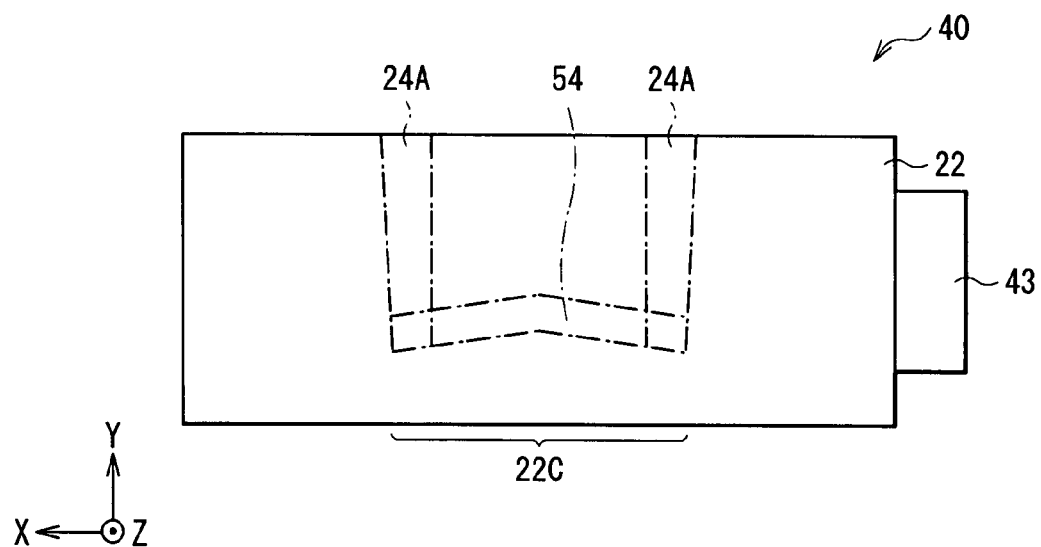
FIG. 35 is a plane diagram of a side face of a modification of the head slider of FIG. 8.
Figure 36:
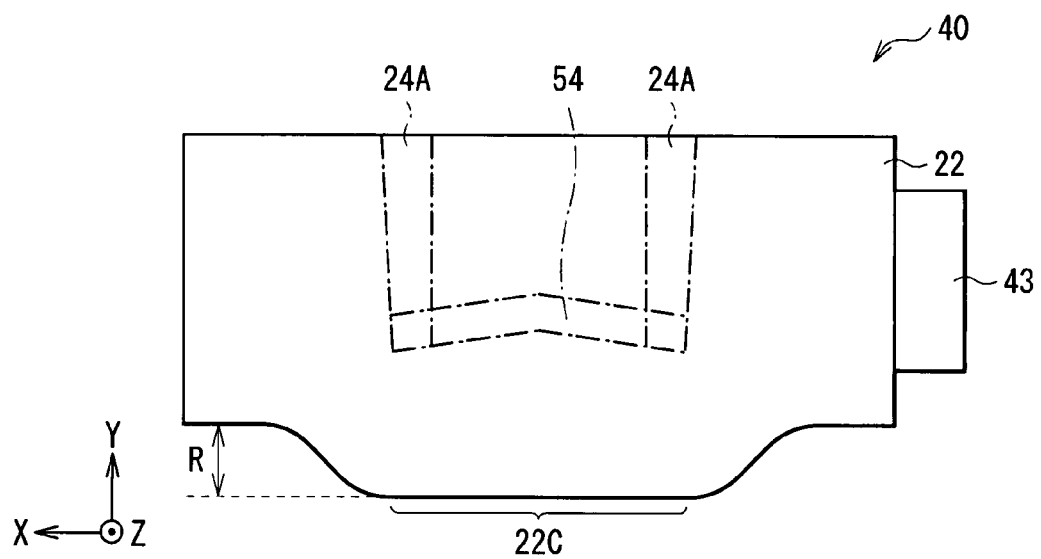
FIG. 36 is a plane diagram of a side face of the head slider of FIG. 35 when a heater is heated.
Figure 37:
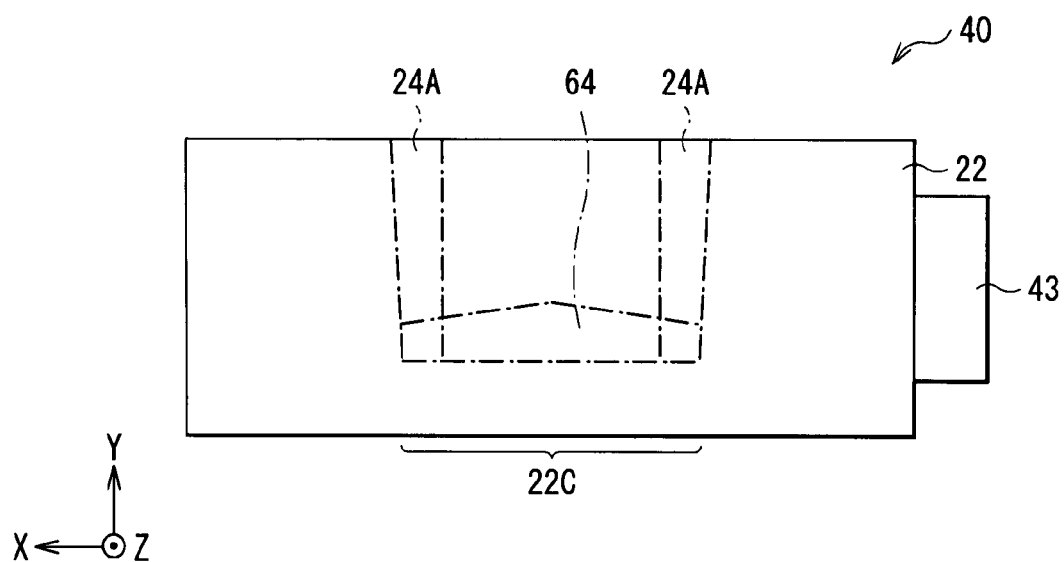
FIG. 37 is a plane diagram of a side face of another modification of the head slider of FIG. 8.
Figure 38:
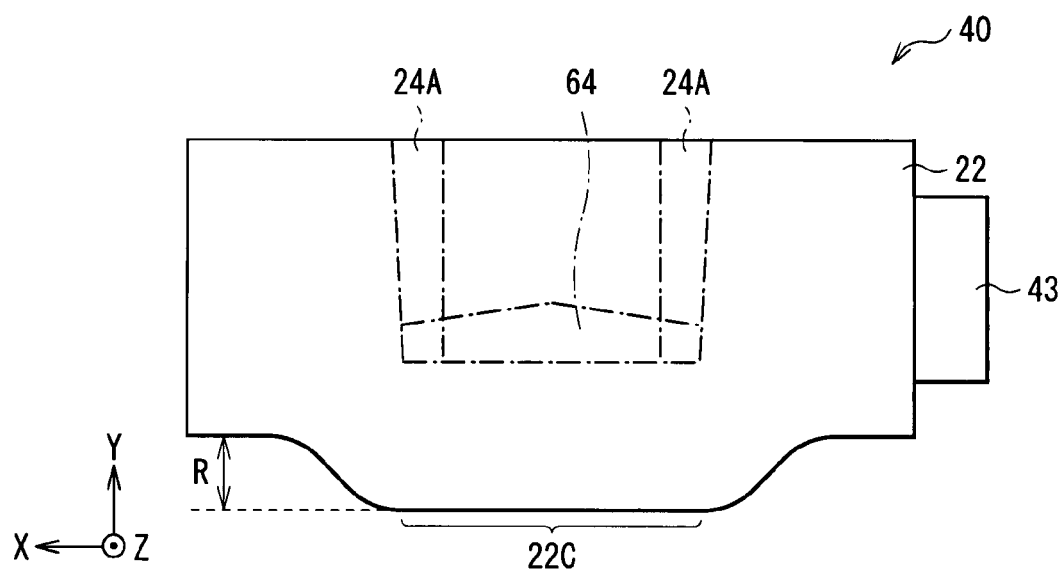
FIG. 38 is a plane diagram of a side face of the head slider of FIG. 37 when a heater is heated.
Figure 39:
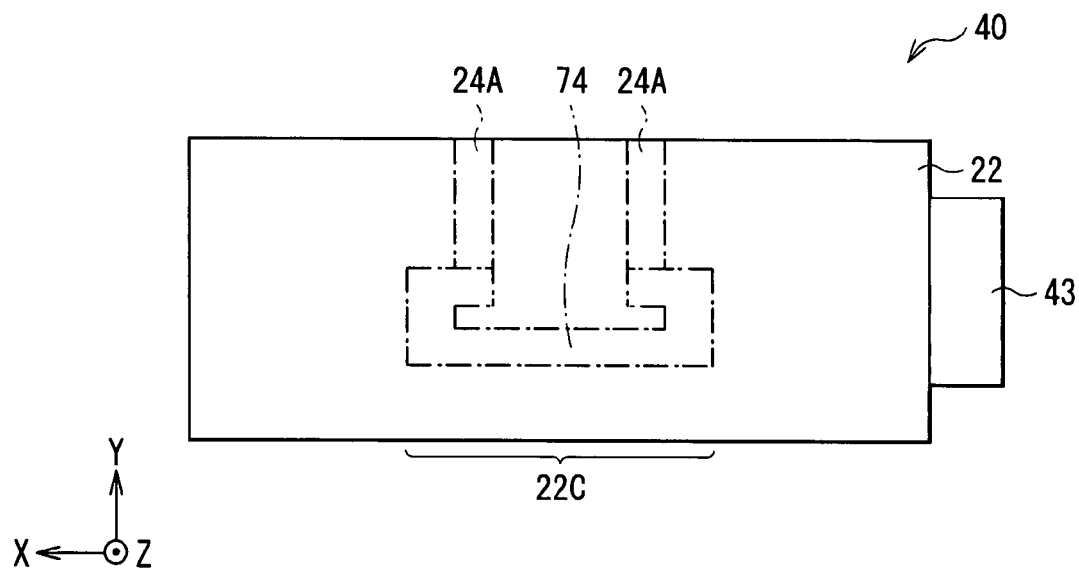
FIG. 39 is a plane diagram of a side face of still another modification of the head slider of FIG. 8.
Figure 40:
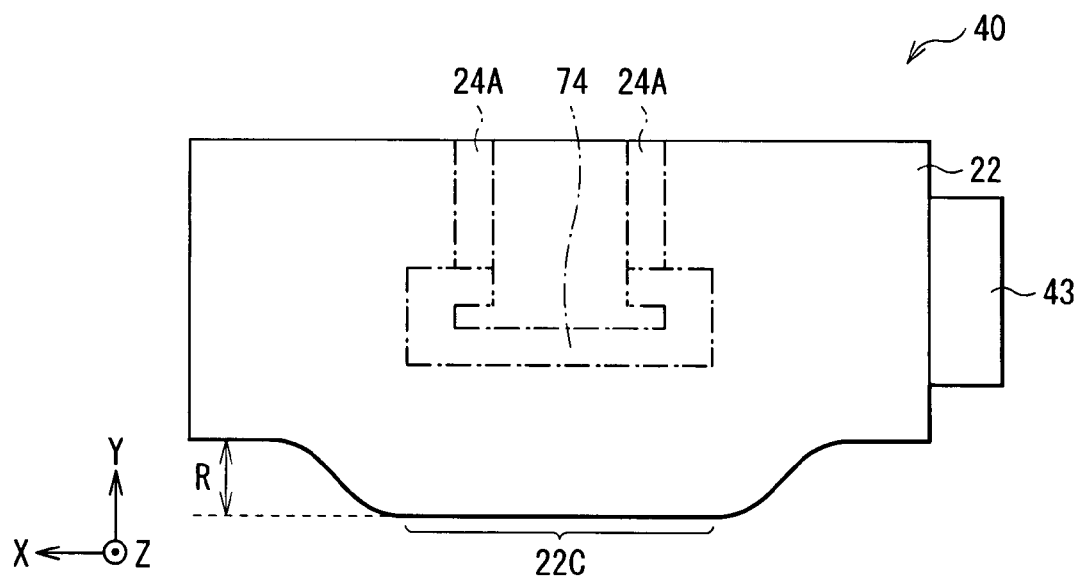
FIG. 40 is a plane diagram of a side face of the head slider of FIG. 39 when a heater is heated.
Figure 41:
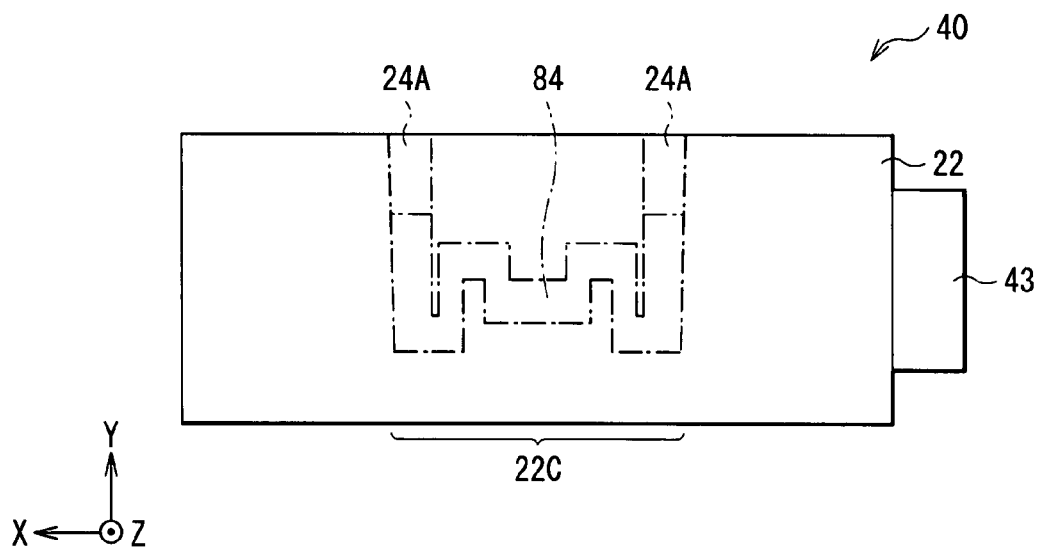
FIG. 41 is a plane diagram of a side face of still another modification of the head slider of FIG. 8.
Figure 42:
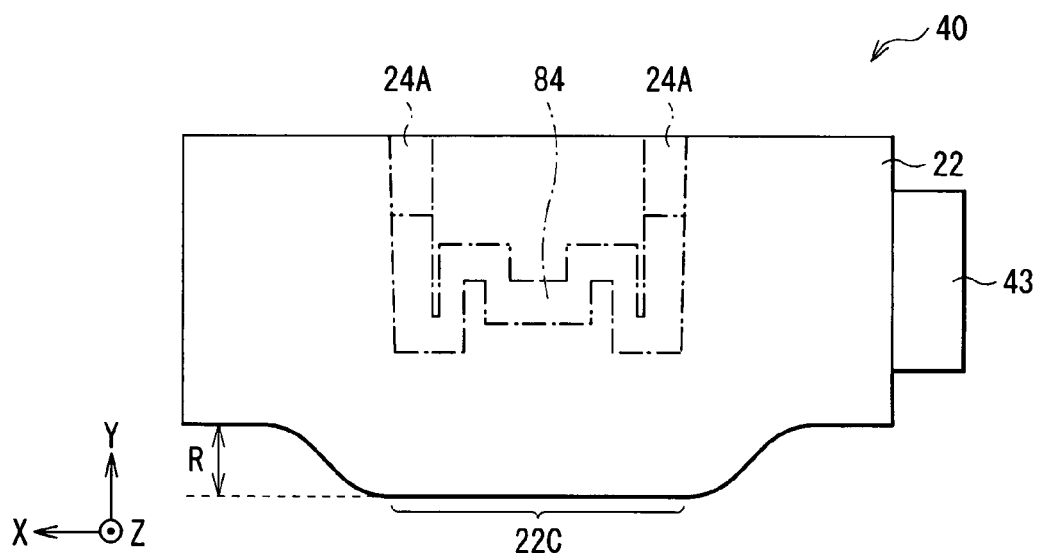
FIG. 42 is a plane diagram of a side face of the head slider of FIG. 41 when a heater is heated.

While the sensor 23 is incorporated within the overcoat layer 22 in the second embodiment, it may be provided outside the overcoat layer 22. For example, a sensor 43 can be provided on a side face of the slider base 21 as shown in the head slider 40 of FIG. 8. In this case, while only the heater 24 is incorporated within the overcoat layer 22 as shown in FIGS. 31 to 33, a distance (flying height H2) between a portion 22D of the air bearing surface 20A, the portion being projected due to thermal expansion, and the surface of the magnetic disk 1 can be made uniform in the track width direction as shown in FIG. 34.

In the above case, a shape of the heater 24 can be deformed as shown in FIGS. 35, 37, 39 and 41. Even if the heater is deformed in such a form, projecting height R of a portion (heater-facing portion 22C) can be made uniform in the track width direction as shown in FIGS. 36, 38, 40 and 42, the portion being the end portion 22A on the trailing edge of the air bearing surface 20A, and facing the heater 54, 64, 74 or 84. Thus, since a distance (flying height H2) between the sensor-facing portion and the surface of the magnetic disk 1 can be made uniform in the track width direction, a wide area in the magnetic disk 1 can be checked in one scan. Again in this case, the width of the heater 54, 64, 74 or 84 is adjusted, thereby an area in the magnetic disk 1 that can be checked in one scan can be easily increased.

Obviously many modifications and variations of the present invention are possible in the light of the above teachings. It is therefore to be understood that within the scope of the appended claims the invention may be practiced otherwise than as specifically described.

What is claimed is:

1. A glide height checking apparatus, comprising:
   a head slider with an air bearing surface, utilized for checking a magnetic disk, and
   a current control section;
   wherein the head slider including
   a plurality of heaters, each heater locally heating a corresponding region of the air bearing surface, and
   a sensor detecting collision of the air bearing surface with a projection on a surface of the magnetic disk; and
   a storage section storing asperity information;
   wherein the current control section supplies a current to each of the plurality of heaters, magnitude of the current being determined based on the asperity information which represents asperity condition of the air bearing surface,
   the asperity information corresponds to magnitude of a current which is supplied to each of the plurality of heaters such that the sensor output is constant irrespective of location of collisions of the air bearing surface with the projection on a surface of the magnetic disk, the collisions being produced in a condition that the head slider is allowed to fly on the magnetic disk rotating with a constant linear velocity and to move in a radial direction of the magnetic disk, so that the projection on the surface of the magnetic disk is allowed to collide, one after another in order, with the air bearing surface at some points thereon.

2. The glide height checking apparatus according to claim 1:
   wherein the plurality of heaters are arranged on a trailing edge of the air bearing surface in a direction of track width along the air bearing surface.

3. The glide height checking apparatus according to claim 1
   wherein the sensor is provided on a trailing edge of the air bearing surface to extend in a direction of track width along the air bearing surface.

4. The glide height checking apparatus according to claim 1:
   wherein the sensor is an AE (Acoustic Emission) sensor, or a sensor having a thermal asperity effect.

5. A glide height checking method, comprising steps of:
   providing a head slider utilized for checking a magnetic disk, with an air bearing surface, the head slider including a plurality of heaters each of which is configured to locally heat a corresponding region of the air bearing surface, and a sensor detecting collision of the air bearing surface with a projection on a surface of the magnetic disk;
   allowing the head slider to fly on the magnetic disk rotating with a constant linear velocity; and
   supplying a current to each of the plurality of heaters so that each heater locally heats a corresponding region of the air bearing surface, magnitude of the current being determined based on asperity information which represents asperity condition of the air bearing surface,
   thereby allowing the projection on the surface of the magnetic disk to collide with the air bearing surface at a constant linear velocity,
   wherein the asperity information corresponds to magnitude of a current which is supplied to each of the plurality of heaters such that the sensor output is constant irrespective of location of collisions of the air bearing surface with the projection on a surface of the magnetic disk, the collisions being produced in a condition that the head slider is allowed to fly on the magnetic disk rotating with a constant linear velocity and to move in a radial direction of the magnetic disk, so that the projection on the surface of the magnetic disk is allowed to collide, one after another in order, with the air bearing surface at some points thereon.

6. A head slider with an air bearing surface, utilized for checking a magnetic disk, comprising:
- a plurality of heaters, each heater locally heating a corresponding region of the air bearing surface;
- a plurality of leads being connected to the plurality of heaters respectively and isolated from one another; and
- a sensor detecting collision of the air bearing surface with a projection on a surface of the magnetic disk,
- wherein the sensor is provided on a trailing edge of the air bearing surface and the heater has a structure such that at least a portion facing the sensor in the trailing edge of the air bearing surface has a uniform temperature distribution when the heater is heated.

7. The head slider according to claim 6:
wherein the heater is provided on a trailing edge of the air bearing surface.

8. The head slider according to claim 7:
wherein the heater extends in a direction of track width along the air bearing surface.

9. The head slider according to claim 8:
wherein the heater has a structure where a central portion is away from the air bearing surface compared with end portions.

10. The head slider according to claim 8:
wherein the heater has a structure where calorific power of a central portion is smaller than that of each of end portions.

11. The head slider according to claim 8:
wherein the sensor is provided on a trailing edge of the air bearing surface to extend in a direction of track width along the air bearing surface, and
length in an extending direction of the heater is 1.3 times as large as that of the sensor.

12. The head slider according to claim 6:
wherein the heater is to locally project the air bearing surface.

13. The head slider according to claim 6:
wherein the sensor is an AE (Acoustic Emission) sensor, or a sensor having a thermal asperity effect.

14. A glide height checking apparatus having a head slider with an air bearing surface, utilized for checking a magnetic disk, comprising:
- a plurality of heaters, each heater locally heating a corresponding region of the air bearing surface;
- a plurality of leads being connected to the plurality of heaters respectively and isolated from one another; and
- a sensor detecting collision of the air bearing surface with a projection on a surface of the magnetic disk,
- wherein the sensor is provided on a trailing edge of the air bearing surface and the heater has a structure such that at least a portion facing the sensor in the trailing edge of the air bearing surface has a uniform temperature distribution when the heater is heated.

15. A head slider with an air bearing surface, utilized for checking a magnetic disk, comprising:
- a plurality of heaters arranged on a trailing edge of the air bearing surface in a direction of track width along the air bearing surface, each heater being configured to locally heat a corresponding portion of the air bearing surface so that a portion of the air bearing surface having an asperity, the asperity caused by a non-uniform amount of recess in the portion of the air bearing surface, is planarized by heating the portion using the plurality of heaters to make a flying height of the slide header uniform in the direction of track width.

* * * * *